(12) United States Patent
Kim et al.

(10) Patent No.: US 11,838,133 B2
(45) Date of Patent: *Dec. 5, 2023

(54) METHOD AND DEVICE FOR TRANSMITTING/RECEIVING HARQ-ACK INFORMATION IN WIRELESS COMMUNICATION SYSTEM

(71) Applicant: LG ELECTRONICS INC., Seoul (KR)

(72) Inventors: Kyuseok Kim, Seoul (KR); Hyungtae Kim, Seoul (KR); Suckchel Yang, Seoul (KR); Jiwon Kang, Seoul (KR); Seonwook Kim, Seoul (KR); Hyunho Lee, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,741

(22) Filed: Nov. 30, 2022

(65) Prior Publication Data

US 2023/0124262 A1    Apr. 20, 2023

Related U.S. Application Data

(63) Continuation of application No. 17/573,828, filed on Jan. 12, 2022, now Pat. No. 11,539,476, which is a (Continued)

(30) Foreign Application Priority Data

Jul. 12, 2019  (KR) .................. 10-2019-0084656
Oct. 4, 2019   (KR) .................. 10-2019-0123406

(51) Int. Cl.
*H04L 1/18*      (2023.01)
*H04L 5/00*      (2006.01)
(Continued)

(52) U.S. Cl.
CPC .......... *H04L 1/1861* (2013.01); *H04L 1/1812* (2013.01); *H04L 5/0055* (2013.01)

(58) Field of Classification Search
CPC ... H04W 28/04; H04W 72/04; H04W 72/042; H04W 88/08; H04L 5/0007; H04L 1/1861; H04L 1/1812; H04L 5/0055
(Continued)

(56) References Cited

U.S. PATENT DOCUMENTS

2012/0113905 A1   5/2012   Anderson et al.
2013/0208692 A1   8/2013   Seo et al.
(Continued)

FOREIGN PATENT DOCUMENTS

KR    20190031438    3/2019
KR    20190049730    5/2019
(Continued)

OTHER PUBLICATIONS

3GPP TSG RAN WG1 #97, Reno, USA, May 13-17, 2019, R1-1906224, Source: NTT Docomo, Inc., Title: Enhancements on multi-TRP/panel transmission, Agenda item: 7.2.8.2. (Year: 2019).*
(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

A method for transmitting and receiving HARQ-ACK information in a wireless communication system and a device therefor are disclosed. Specifically, a method of transmitting, by a user equipment (UE), HARQ-ACK information in a wireless communication system comprises receiving first downlink control information (DCI) based on a first control resource set group and second DCI based on a second control resource set group; determining a physical uplink control channel (PUCCH) resource for a transmission of the
(Continued)

HARQ-ACK information; and transmitting the HARQ-ACK information based on the determined PUCCH resource, wherein the first DCI and the second DCI are indexed based on (i) an index of a physical downlink control channel (PDCCH) related monitoring occasion, (ii) a cell index, and (iii) an index associated with each control resource set group, and wherein the PUCCH resource is determined based on a last DCI among the first DCI and the second DCI.

15 Claims, 15 Drawing Sheets

Related U.S. Application Data continuation of application No. PCT/KR2020/009202, filed on Jul. 13, 2020.

(51) Int. Cl.
*H04L 1/1829* (2023.01)
*H04L 1/1812* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2017/0273056 | A1* | 9/2017 | Papasakellariou | .... H04L 1/1861 |
| 2020/0106569 | A1* | 4/2020 | Tsai | ...... H04W 72/23 |
| 2021/0127285 | A1 | 4/2021 | Khoshnevisan et al. | |
| 2021/0185670 | A1 | 6/2021 | Boroujeni et al. | |
| 2021/0234640 | A1* | 7/2021 | Cirik | ...... H04L 1/1819 |
| 2022/0030577 | A1 | 1/2022 | Zhou et al. | |
| 2022/0046691 | A1 | 2/2022 | Kim et al. | |
| 2023/0087512 | A1* | 3/2023 | Lei | ........ H04L 1/1825 370/329 |
| 2023/0095598 | A1* | 3/2023 | Zhang | ......... H04L 1/0061 370/329 |
| 2023/0115228 | A1* | 4/2023 | Zhou | ...... H04W 72/21 370/329 |

FOREIGN PATENT DOCUMENTS

| | | | | |
|---|---|---|---|---|
| KR | 20190082906 | | 7/2019 | |
| WO | WO 2018/228487 | A1 * | 12/2018 | ............ H04W 72/04 |
| WO | WO2018228487 | | 12/2018 | |
| WO | WO2020033901 | | 2/2020 | |

OTHER PUBLICATIONS

3GPP TSG RAN WG1 Meeting #97, Reno, USA, May 13-17, 2019, R1-1907706, Agenda item: 7.2.8.2, Source: Huawet, HiSilicon, Title: Summary of AI: 7.2.8.2 Enhancements on Multi-TRP/Panel Transmission of offline Discussion. (Year: 2019).*
3GPP TSG RAN WG1 #97, Reno, USA, May 13-17, 2019, R1-1906744, Agenda item: 7.2.6.2, Source: NEC, Title: UCI enhancements for NR URLLC. (Year: 2019).*
3GPP TSG RAN WG1 Meeting AH 1801, Vancouver, Canada, Jan. 22-26, 2018, R1-1801152, Source: OPPO, Title: Summary of offline discussion on PUCCH resource allocation, Agenda item: 7.3.2.4. (Year: 2018).*
Huawei & HiSilicon, "Summary of AI: 7.2.8.2 Enhancements on Multi-TRP/Panel Transmission of Offline Discussion," R1-1907706, Presented at 3GPP TSG RAN WG1 Meeting #97, Reno, USA, May 13-17, 2019, 66 pages.
International Search Report in International Appln. No. PCT/KR2020/009202, dated Oct. 27, 2020, 6 pages (with English translation).
LG Electronics, "Discussion on multiple transport blocks scheduling in MTC," R1-1904607, Presented at 3GPP TSG RAN WG1 #96bis, Xi'an, China, Apr. 8-12, 2019, 10 pages.
LG Electronics, "Remaining issues on PUCCH resource allocation," R1-1800378, Presented at 3GPP TSG RAN WG1 Meeting AH 1801, Vancouver, Canada, Jan. 22-26, 2018, 16 pages.
NEC, "UCI enhancements for NR URLLC," R1-1906744, Presented at 3GPP TSG RAN WG1 #97, Reno, USA, May 13-17, 2019, 6 pages.
Notice of Allowance In Korean Appln. No. 10-2020-0086223, dated Jan. 29, 2021, 5 pages (with English translation).
NTT Docomo, Inc, "Enhancements on multi-TRP/panel transmission," R1-1906224, Presented at 3GPP TSG RAN WG1 #97, Reno, USA, May 13-17, 2019, 32 pages.
OPPO, "Summary of offline discussions on PUCCH resource allocation," R1-1801152, Presented at 3GPP TSG RAN WG1 Meeting AH 1801, Vancouver, Canada, Jan. 22-26, 2018, 10 pages.

* cited by examiner

[FIG. 1]
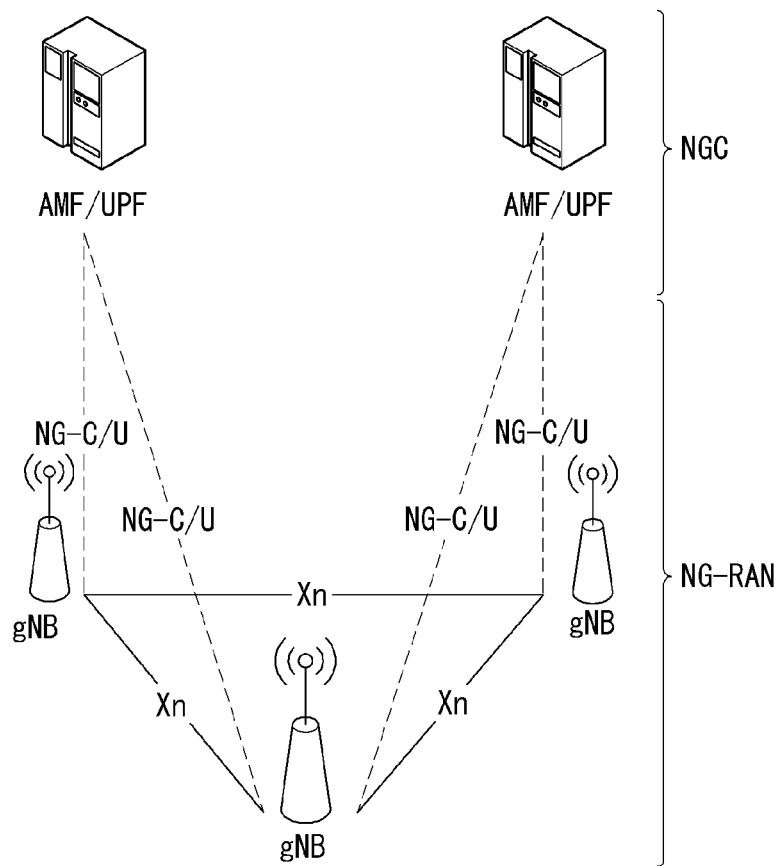
[FIG. 2]
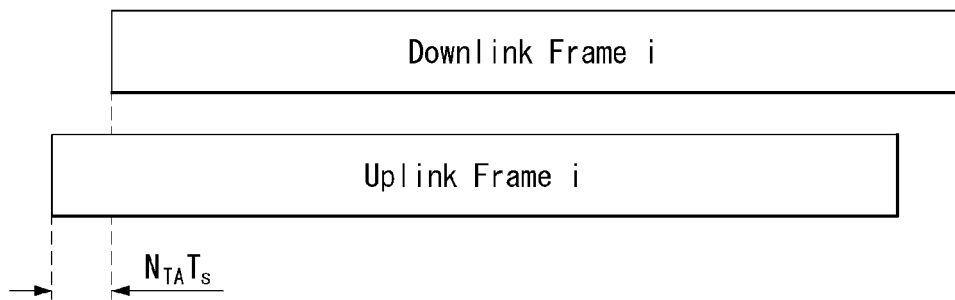

[ FIG. 3 ]
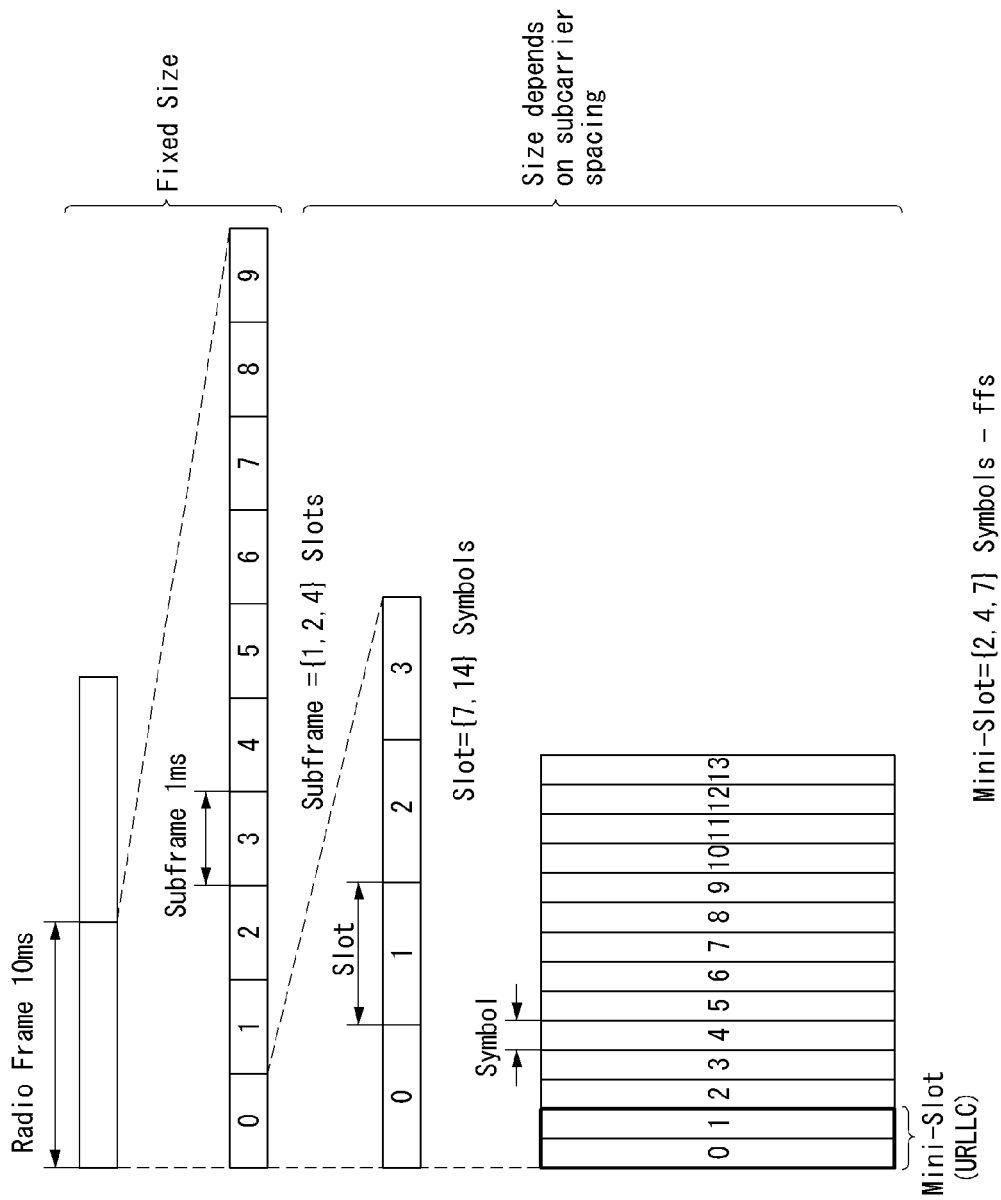

[FIG. 4]
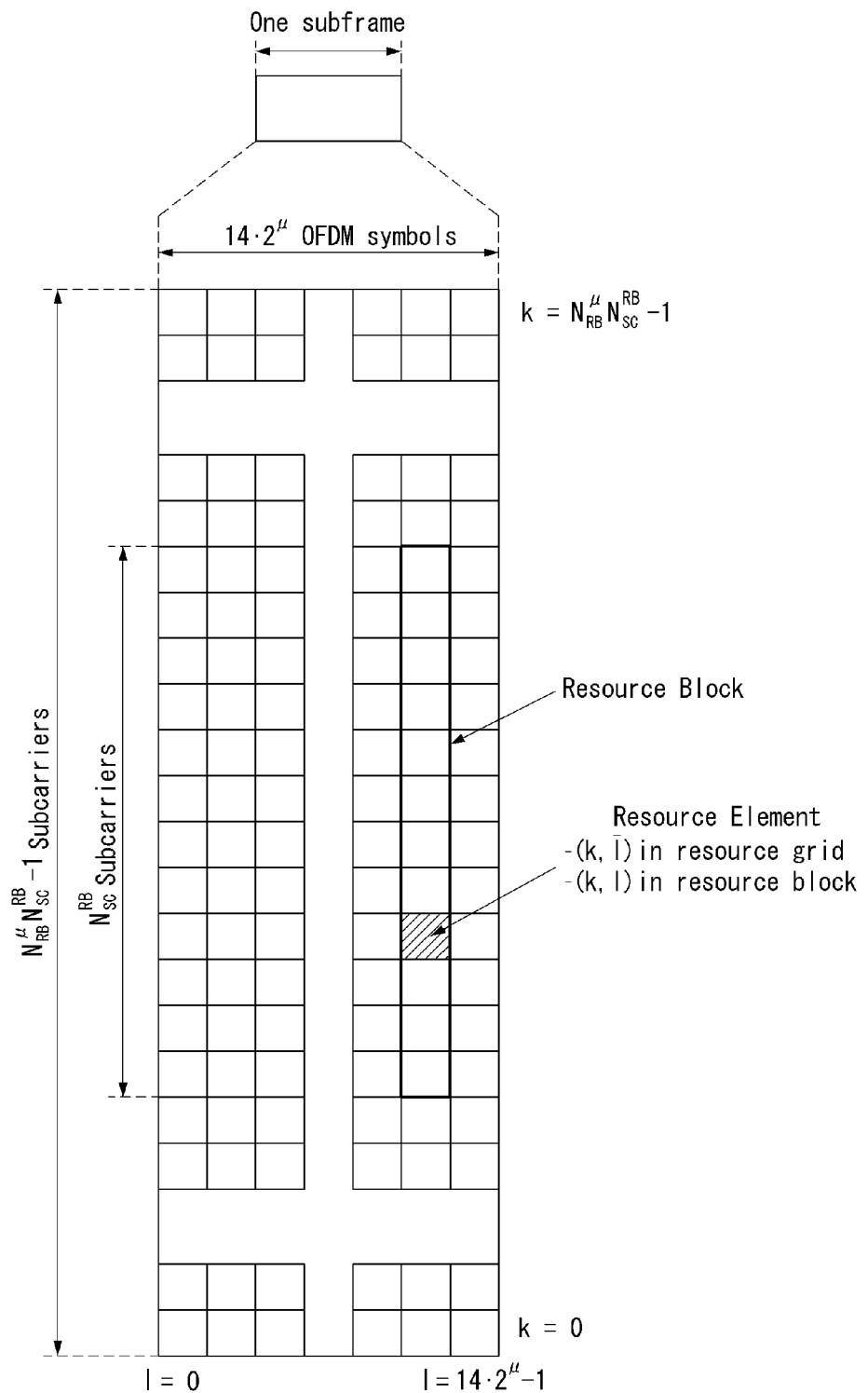

[FIG. 5]
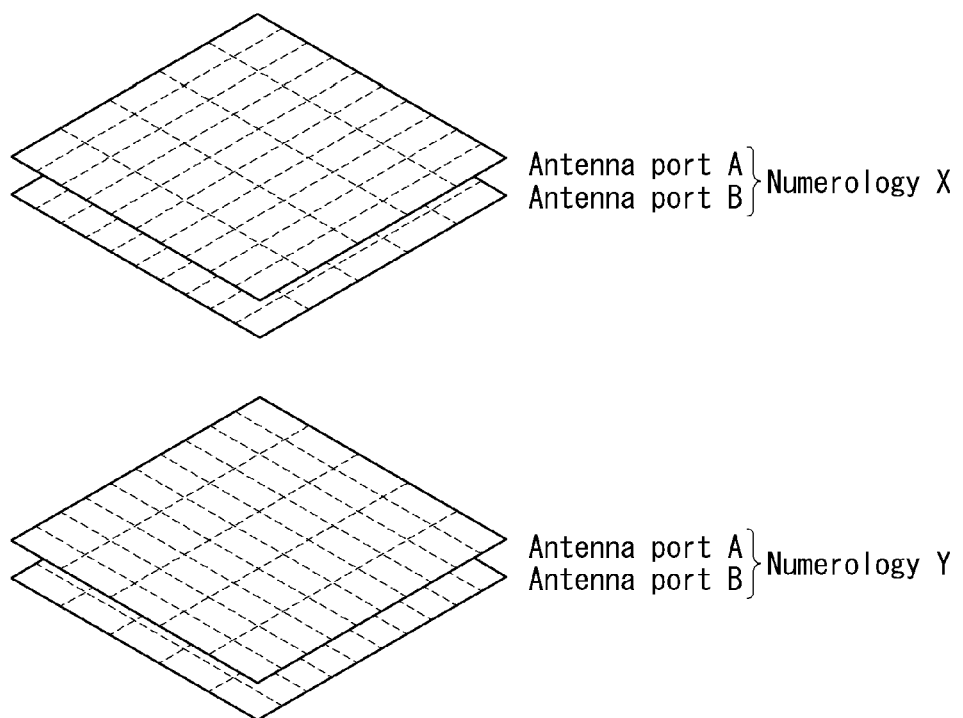

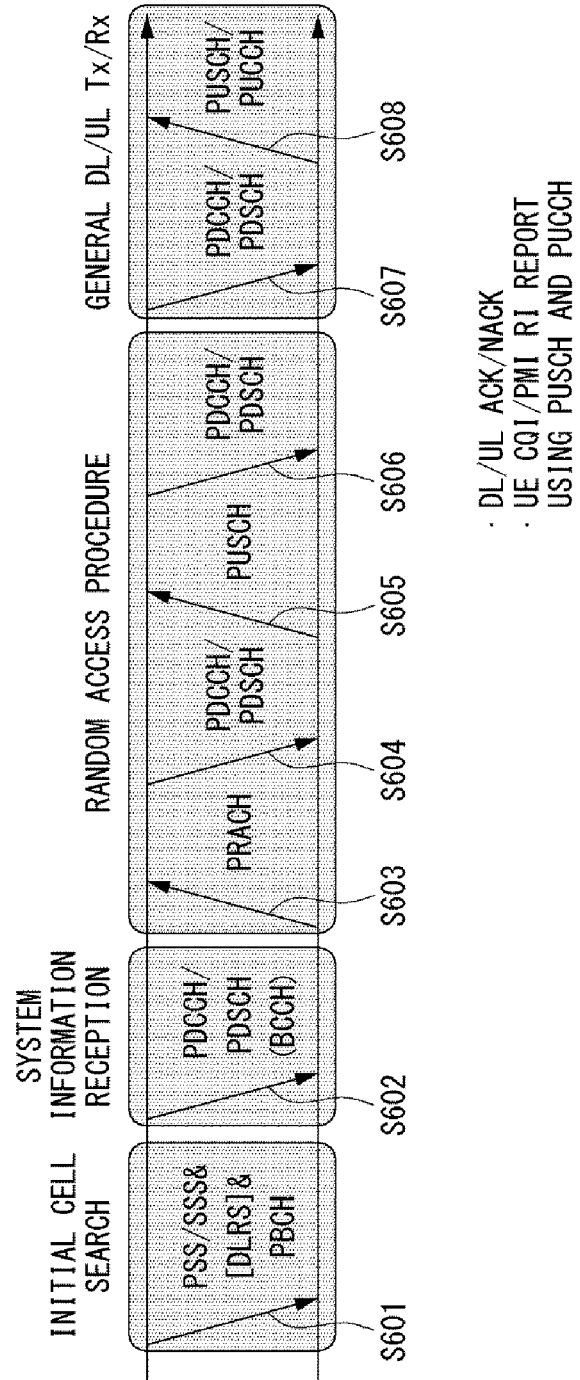
[ FIG. 6 ]

[FIG. 7]
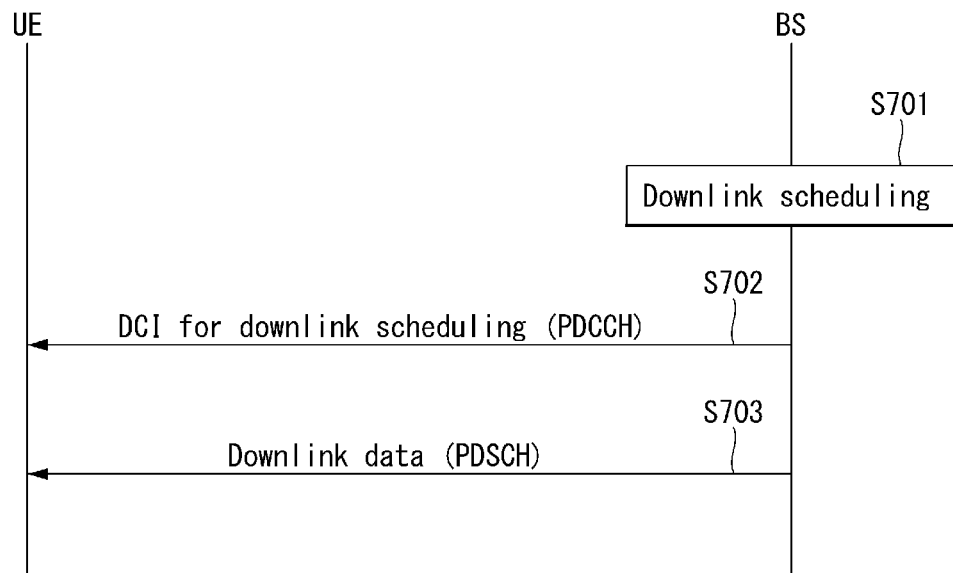
[FIG. 8]
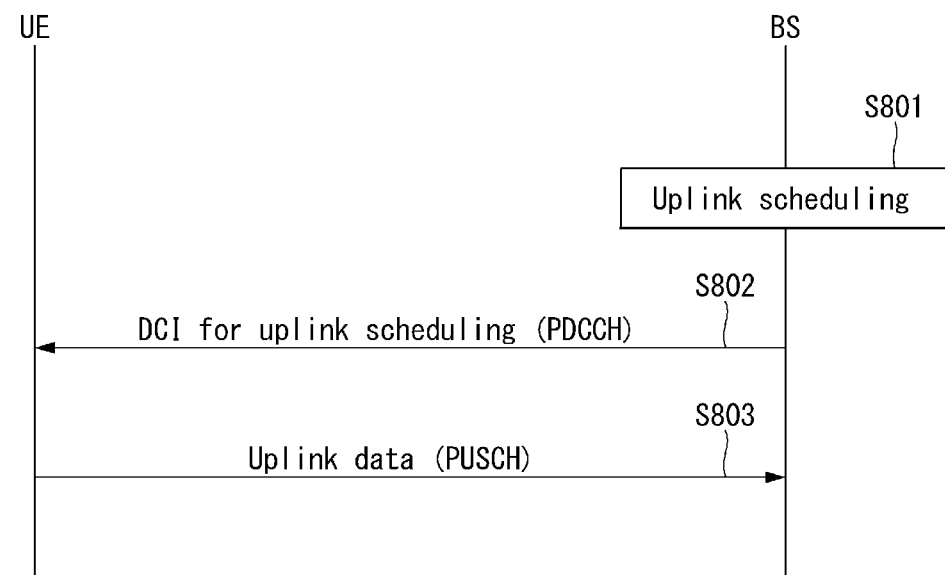

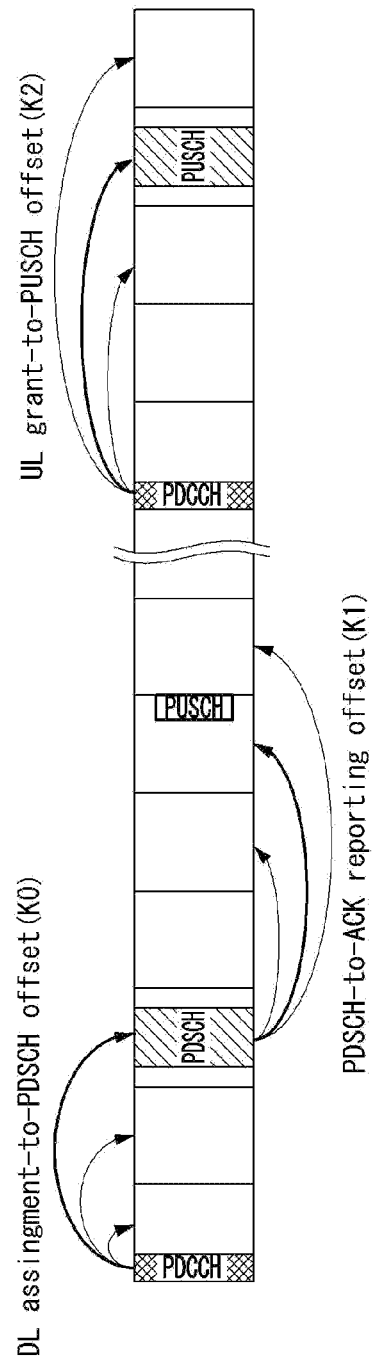
[ FIG. 9 ]

【FIG. 10A】
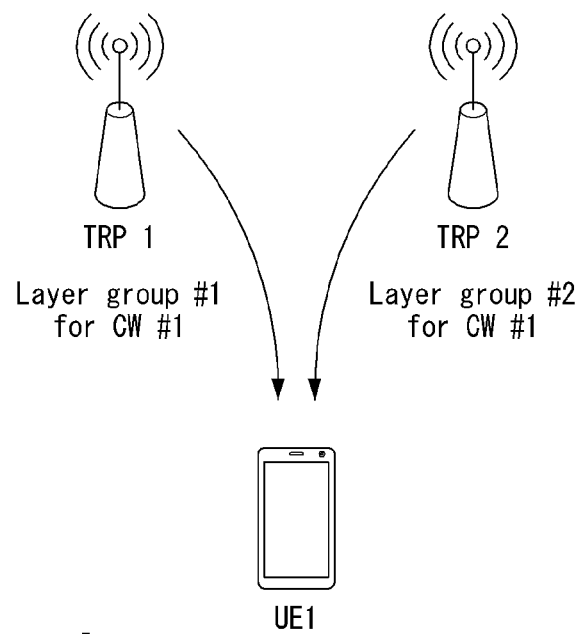
【FIG. 10B】
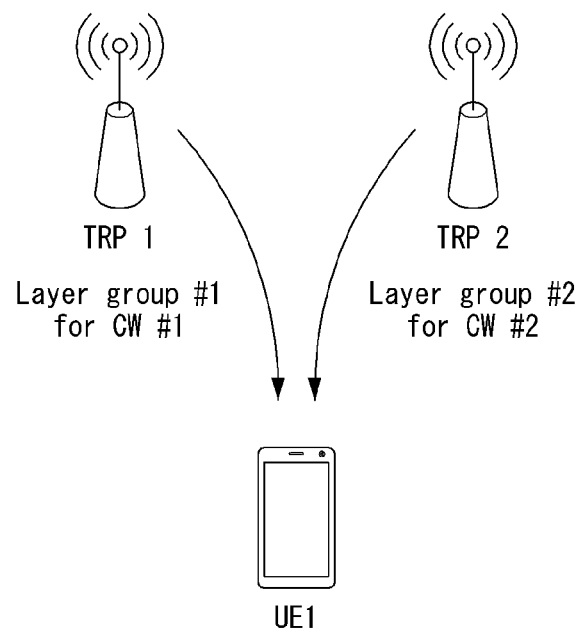

【FIG. 11A】
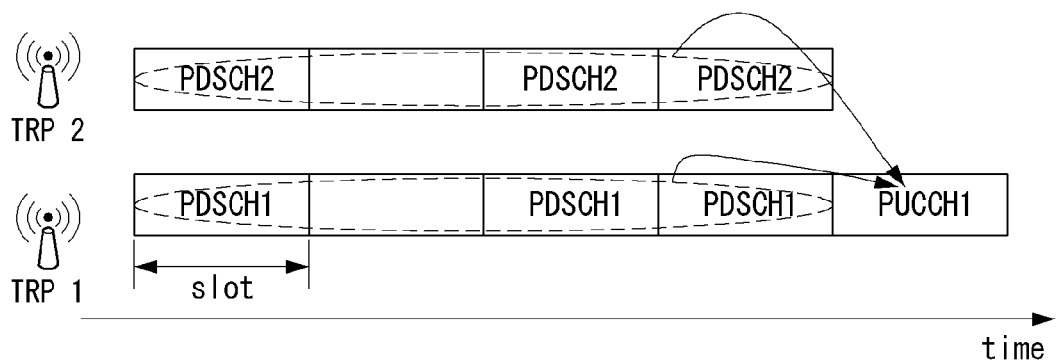
【FIG. 11B】
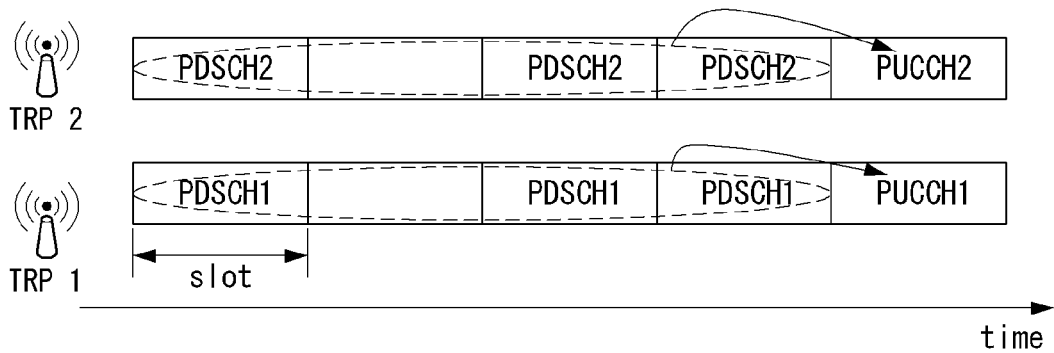

[ FIG. 12 ]
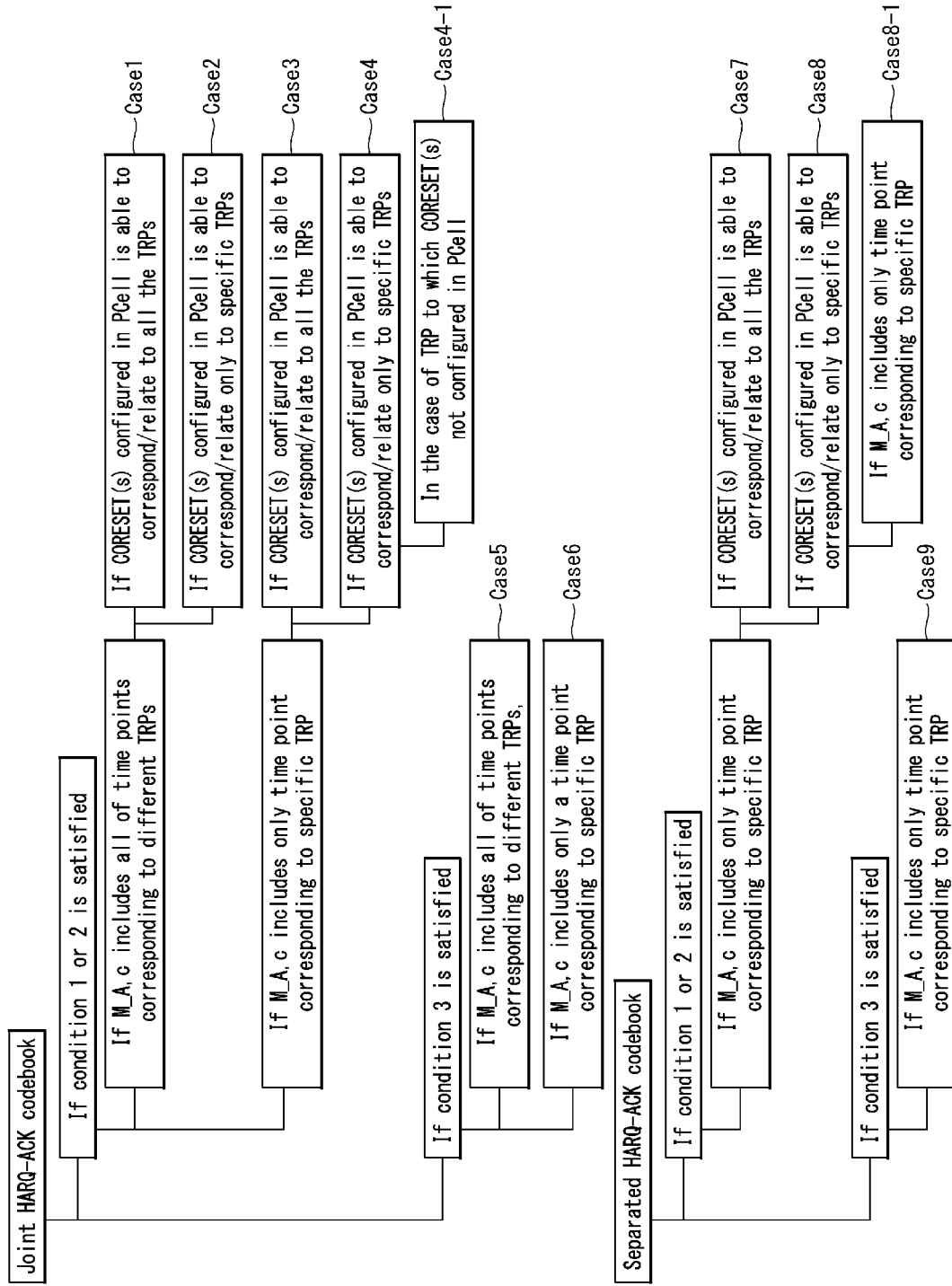

[FIG. 13]
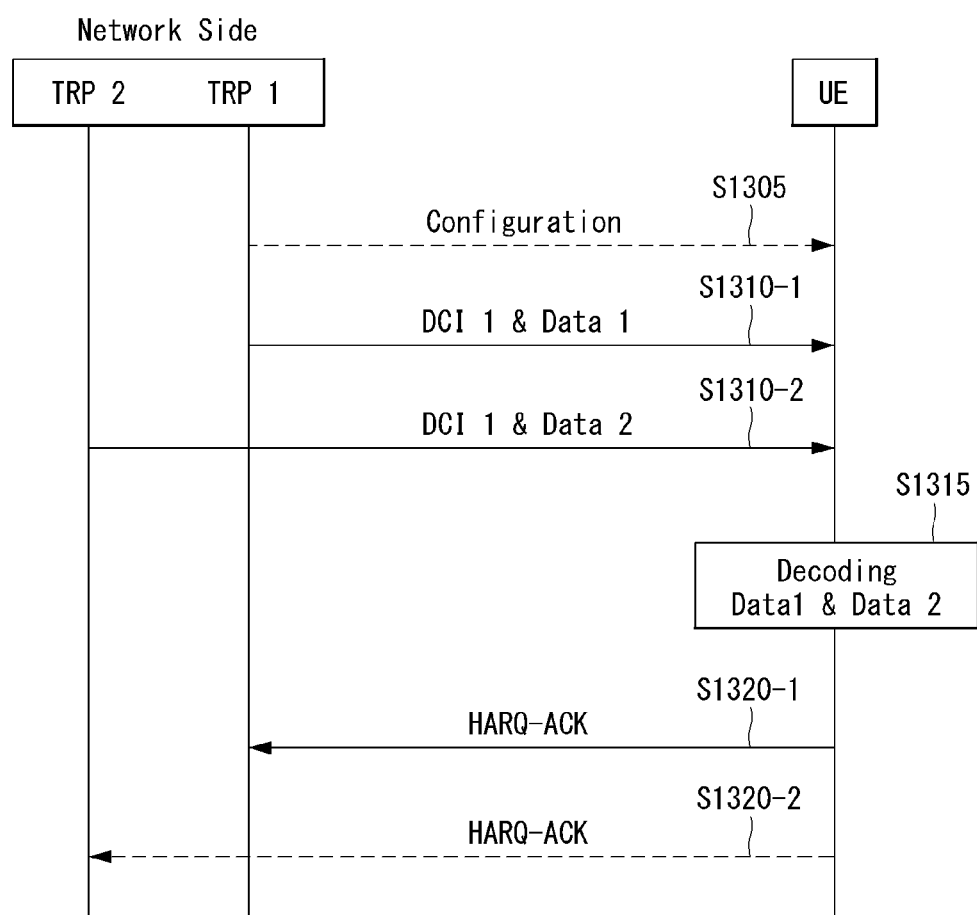

[FIG. 14]
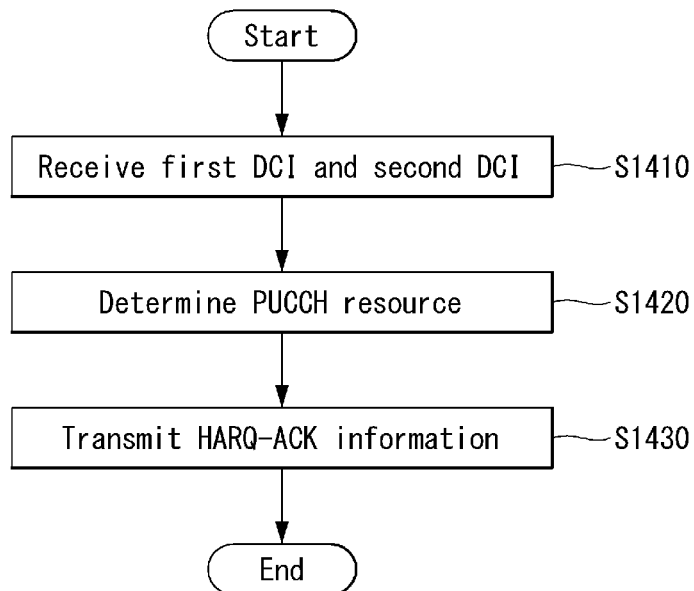
[FIG. 15]
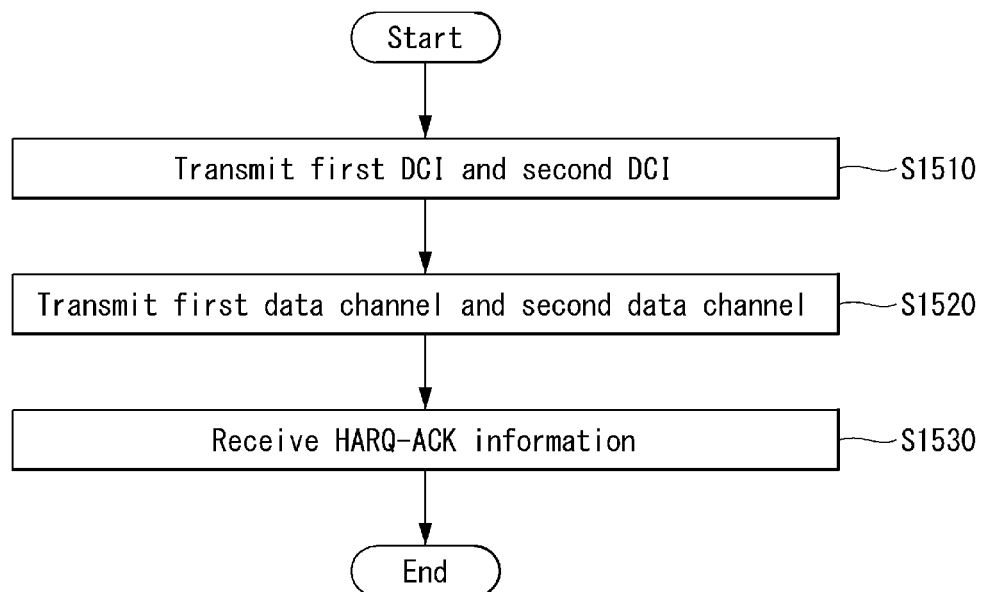

[FIG. 16]
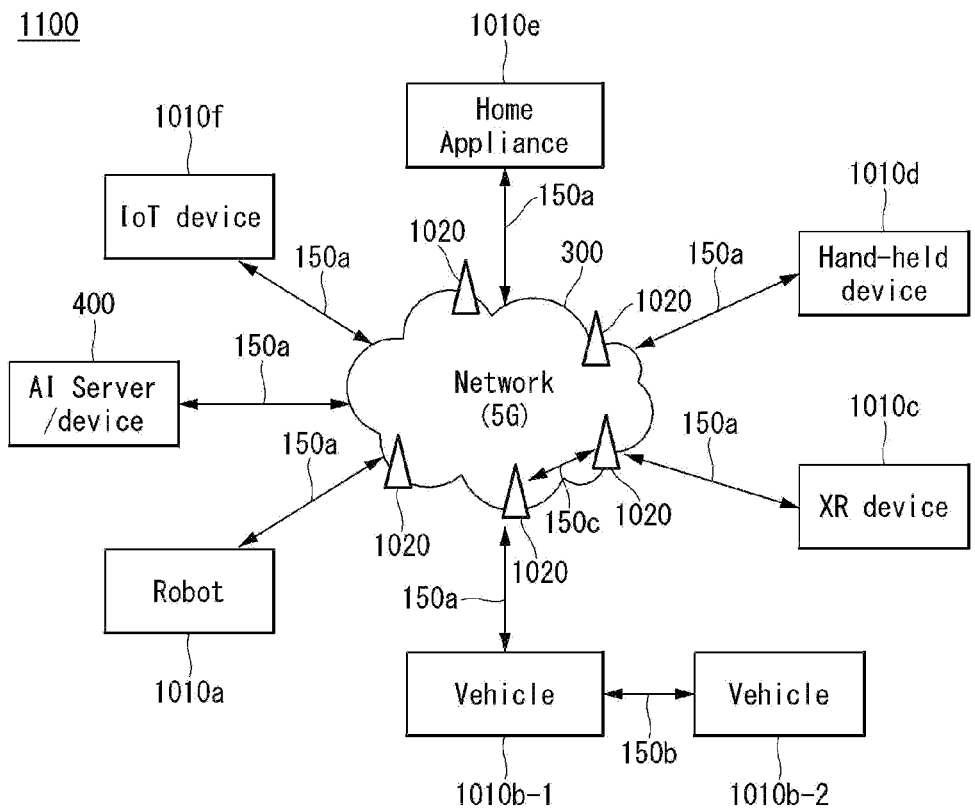
[FIG. 17]
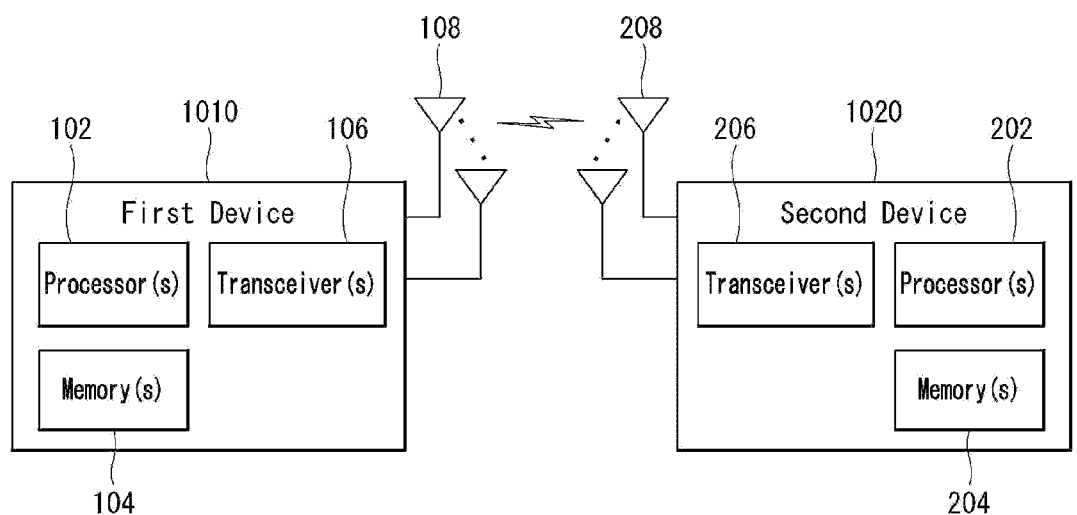

[FIG. 18]
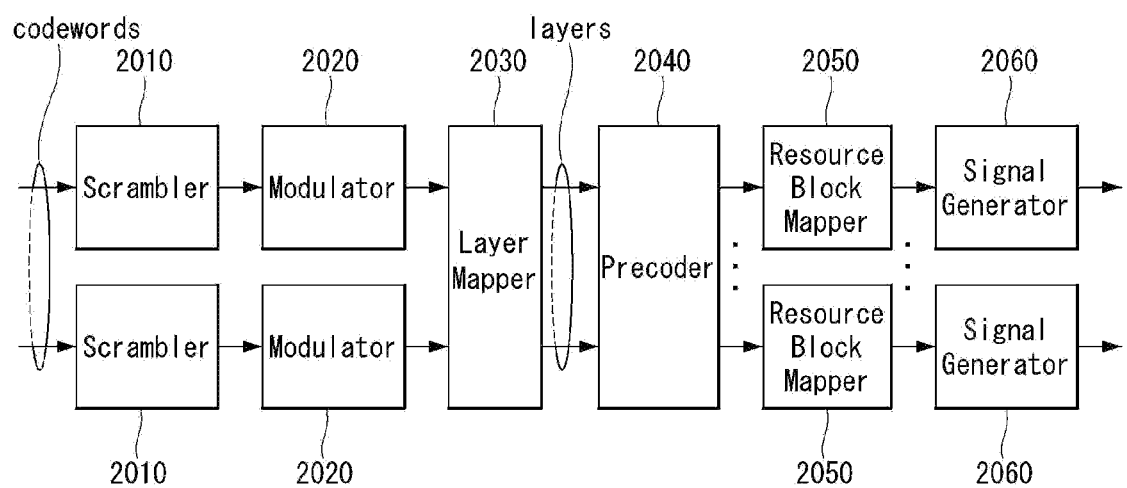
[FIG. 19]
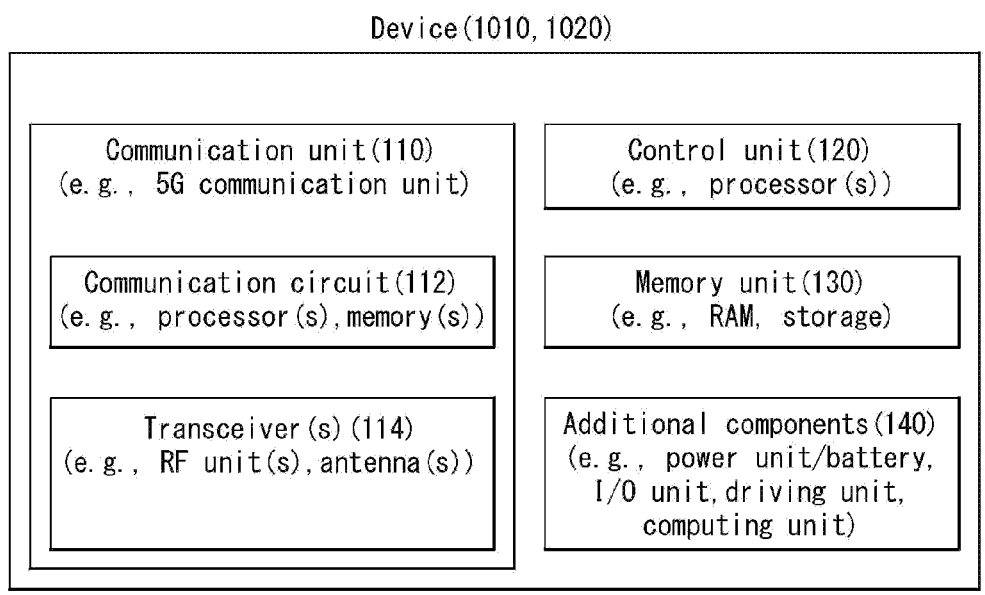

[FIG. 20]
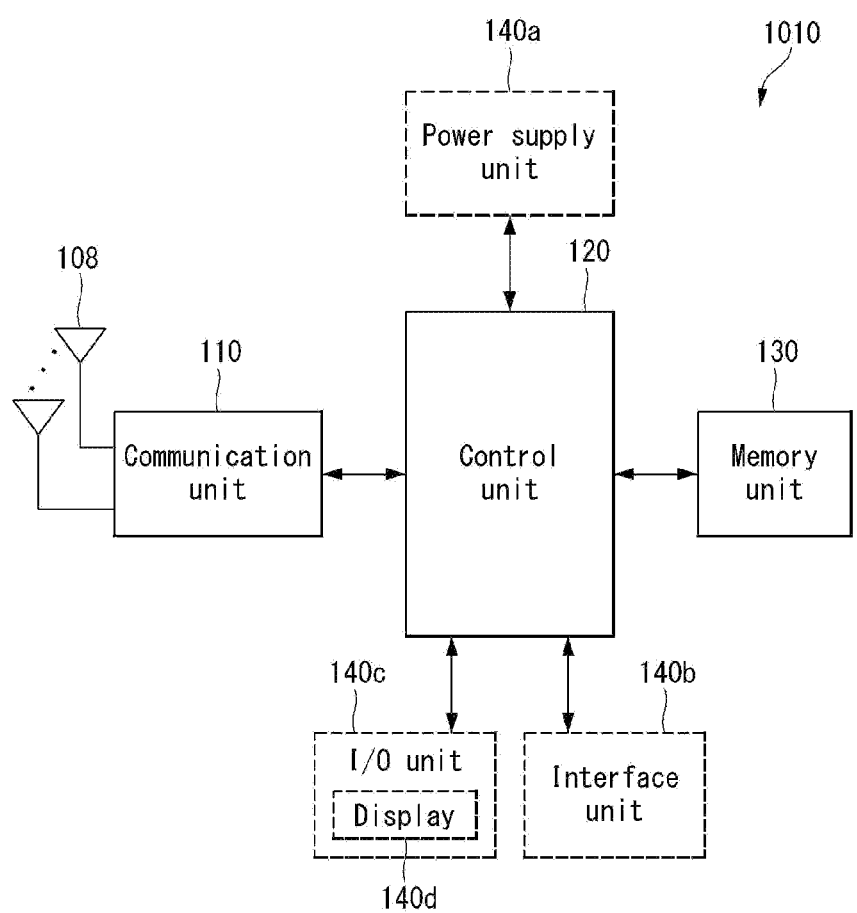

METHOD AND DEVICE FOR TRANSMITTING/RECEIVING HARQ-ACK INFORMATION IN WIRELESS COMMUNICATION SYSTEM

CROSS-REFERENCE TO RELATED APPLICATIONS

This application is a continuation of U.S. application Ser. No. 17/573,828, filed on Jan. 12, 2022, which is a continuation of International Application No. PCT/KR2020/009202, filed on Jul. 13, 2020, which claims the benefit of Korean Application No. 10-2019-0084656, filed on Jul. 12, 2019, and Korean Application No. 10-2019-0123406, filed on Oct. 4, 2019, the contents of which are all hereby incorporated by reference herein in their entirety.

TECHNICAL FIELD

The present disclosure relates to a wireless communication system, and more particularly to a method for transmitting and receiving HARQ-ACK information based on multiple transmission reception points (TRPs) and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY

The present disclosure provides a method of transmitting and receiving HARQ-ACK information by a UE supported by multiple transmission reception points (TRPs) in a wireless communication system.

More specifically, the present disclosure provides a method of constructing a HARQ-ACK codebook considering a multi-TRP operation.

The present disclosure also provides a method of distinguishing multiple TRPs based on an index of a control resource set group (or pool) associated with a control resource set received on a downlink control channel.

The present disclosure also provides a method of determining a resource of an uplink channel for transmitting HARQ-ACK information.

Technical objects to be achieved by the present disclosure are not limited to the aforementioned technical objects, and other technical objects not described above may be evidently understood by a person having ordinary skill in the art to which the present disclosure pertains from the following description.

In one aspect of the present disclosure, there is provided a method of transmitting, by a user equipment (UE), hybrid automatic repeat and reQuest-acknowledgement (HARQ-ACK) information in a wireless communication system, the method comprising receiving first downlink control information (DCI) based on a first control resource set group and second DCI based on a second control resource set group; determining a physical uplink control channel (PUCCH) resource for a transmission of the HARQ-ACK information; and transmitting the HARQ-ACK information based on the determined PUCCH resource, wherein the first DCI and the second DCI are indexed based on (i) an index of a physical downlink control channel (PDCCH) related monitoring occasion, (ii) a cell index, and (iii) an index associated with each control resource set group, and wherein the PUCCH resource is determined based on a last DCI among the first DCI and the second DCI.

The method may further comprise receiving configuration information, and the configuration information may include information related to a feedback mode of the HARQ-ACK information.

The information related to the feedback mode may indicate one of a joint mode or a separate mode.

The first DCI and the second DCI may be indexed in an ascending order of the cell index for the same PDCCH related monitoring occasion, and then may be indexed in an ascending order of the index of the PDCCH related monitoring occasion.

Based on that the information related to the feedback mode indicates the joint mode, first HARQ-ACK information associated with the first control resource set group and second HARQ-ACK information associated with the second control resource set group may be concatenated to construct one HARQ-ACK information.

Based on that an index associated with the first control resource set group is 0, and an index associated with the second control resource set group is 1, the first DCI may be indexed earlier than the second DCI.

Based on that the information related to the feedback mode indicates the separate mode, first HARQ-ACK information associated with the first control resource set group and second HARQ-ACK information associated with the second control resource set group each may be TDMed (time division multiplexing) in one slot and may be transmitted.

The first control resource set group may be included in a first serving cell, and the second control resource set group may be included in a second serving cell. A first HARQ-ACK codebook for the first serving cell and a second HARQ-ACK codebook for the second serving cell may be separately generated. The HARQ-ACK information may be generated by concatenating the first HARQ-ACK codebook and the second HARQ-ACK codebook.

Each DCI may include a PUCCH resource indicator field.

The method may further comprise receiving a first data channel scheduled by the first DCI and a second data channel scheduled by the second DCI. The HARQ-ACK information may be related to the first data channel and the second data channel.

The first DCI and the first data channel may be received through a first transmission and reception point, and the second DCI and the second data channel may be received through a second transmission and reception point.

The HARQ-ACK information may be transmitted through at least one of a first transmission and reception point or a second transmission and reception point.

In another aspect of the present disclosure, there is provided a user equipment (UE) transmitting hybrid automatic repeat and reQuest-acknowledgement (HARQ-ACK) information in a wireless communication system, the UE comprising one or more transceivers; one or more processors; and one or more memories configured to store instructions for operations executed by the one or more processors and connected to the one or more processors, wherein the operations comprise receiving first downlink control information (DCI) based on a first control resource set group and second DCI based on a second control resource set group; determining a physical uplink control channel (PUCCH) resource for a transmission of the HARQ-ACK information; and transmitting the HARQ-ACK information based on the determined PUCCH resource, wherein the first DCI and the second DCI are indexed based on (i) an index of a physical downlink control channel (PDCCH) related monitoring occasion, (ii) a cell index, and (iii) an index associated with each control resource set group, and wherein the PUCCH resource is determined based on a last DCI among the first DCI and the second DCI.

In another aspect of the present disclosure, there is provided a method of receiving, by a base station (BS), hybrid automatic repeat and reQuest-acknowledgement (HARQ-ACK) information in a wireless communication system, the method comprising transmitting, to a user equipment (UE), first downlink control information (DCI) based on a first control resource set group and second DCI based on a second control resource set group; transmitting, to the UE, a first data channel scheduled by the first DCI and a second data channel scheduled by the second DCI; and receiving, from the UE, the HARQ-ACK information based on a physical uplink control channel (PUCCH) resource, wherein the HARQ-ACK information is related to the first data channel and the second data channel, wherein the first DCI and the second DCI are indexed based on (i) an index of a physical downlink control channel (PDCCH) related monitoring occasion, (ii) a cell index, and (iii) an index associated with each control resource set group, and wherein the PUCCH resource is determined based on a last DCI among the first DCI and the second DCI.

In another aspect of the present disclosure, there is provided abase station (BS) receiving hybrid automatic repeat and reQuest-acknowledgement (HARQ-ACK) information in a wireless communication system, the base station comprising one or more transceivers; one or more processors; and one or more memories configured to store instructions for operations executed by the one or more processors and connected to the one or more processors, wherein the operations comprise transmitting, to a user equipment (UE), first downlink control information (DCI) based on a first control resource set group and second DCI based on a second control resource set group; transmitting, to the UE, a first data channel scheduled by the first DCI and a second data channel scheduled by the second DCI; and receiving, from the UE, the HARQ-ACK information based on a physical uplink control channel (PUCCH) resource, wherein the HARQ-ACK information is related to the first data channel and the second data channel, wherein the first DCI and the second DCI are indexed based on (i) an index of a physical downlink control channel (PDCCH) related monitoring occasion, (ii) a cell index, and (iii) an index associated with each control resource set group, and wherein the PUCCH resource is determined based on a last DCI among the first DCI and the second DCI.

In another aspect of the present disclosure, there is provided a device comprising one or more memories; and one or more processors operatively connected to the one or more memories, wherein the one or more processors are configured to allow the device to receive first downlink control information (DCI) based on a first control resource set group and second DCI based on a second control resource set group; determine a physical uplink control channel (PUCCH) resource for a transmission of the HARQ-ACK information; and transmit the HARQ-ACK information based on the determined PUCCH resource, wherein the first DCI and the second DCI are indexed based on (i) an index of a physical downlink control channel (PDCCH) related monitoring occasion, (ii) a cell index, and (iii) an index associated with each control resource set group, and wherein the PUCCH resource is determined based on a last DCI among the first DCI and the second DCI.

In another aspect of the present disclosure, there is provided one or more non-transitory computer readable mediums storing one or more instructions, wherein the one or more instructions executable by one or more processors allow a user equipment (UE) to receive first downlink control information (DCI) based on a first control resource set group and second DCI based on a second control resource set group; determine a physical uplink control channel (PUCCH) resource for a transmission of the HARQ-ACK information; and transmit the HARQ-ACK information based on the determined PUCCH resource, wherein the first DCI and the second DCI are indexed based on (i) an index of a physical downlink control channel (PDCCH) related monitoring occasion, (ii) a cell index, and (iii) an index associated with each control resource set group, and wherein the PUCCH resource is determined based on a last DCI among the first DCI and the second DCI.

Embodiments of the present disclosure can transmit and receive HARQ-ACK information for multiple TRPs.

Embodiments of the present disclosure can also construct a HARQ-ACK codebook considering a multi-TRP operation.

Embodiments of the present disclosure can also determine a resource of an uplink channel for transmitting HARQ-ACK information and transmit and receive HARQ-ACK information based on the determined resource.

Embodiments of the present disclosure can also, when an index of a control resource set group associated with a control resource set is not indicated/configured, determine the index of the control resource set group as a specific value.

Effects which may be obtained from the present disclosure are not limited by the above effects, and other effects that have not been mentioned may be clearly understood from the following description by those skilled in the art to which the present disclosure pertains.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission.

FIG. 7 illustrates an example of a downlink transmission/reception operation.

FIG. 8 illustrates an example of an uplink transmission/reception operation.

FIG. 9 illustrates an example of HARQ-ACK timing (K1).

FIGS. 10A and 10B illustrate an example of a transmission/reception method for improving reliability using transmission in multiple TRPs.

FIGS. 11A and 11B illustrate an example of a method of generating a HARQ-ACK codebook for multiple TRPs (e.g., TRP1, TRP2).

FIG. 12 illustrates an example of a summary diagram illustrating various cases for conditions related to generation of a compressed semi-static HARQ-ACK codebook and operations corresponding to the conditions.

FIG. 13 illustrates an example of a signalling procedure performing data transmission/reception between a network side and a UE in a situation of multiple TRPs to which methods and/or embodiments described in the present disclosure are applicable.

FIG. 14 illustrates an example of an operation flow chart of a UE performing data transmission/reception to which methods and/or embodiments described in the present disclosure are applicable.

FIG. 15 illustrates an example of an operation flow chart of a base station performing data transmission/reception to which methods and/or embodiments described in the present disclosure are applicable.

FIG. 16 illustrates a communication system applied to the present disclosure.

FIG. 17 illustrates a wireless device which may be applied to the present disclosure.

FIG. 18 illustrates a signal processing circuit for a transmit signal.

FIG. 19 illustrates another example of a wireless device applied to the present disclosure.

FIG. 20 illustrates a portable device applied to the present disclosure.

DETAILED DESCRIPTION

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is anew requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
| --- | --- | --- |
| FR1 | 410 MHz-7125 mHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10'$ and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology $\mu$, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 3 illustrates an example of a frame structure in a NR system. FIG. 3 is merely for convenience of explanation and does not limit the scope of the present disclosure.

In Table 4, in case of $\mu=2$, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ Subcarriers on a frequency domain, each subframe consisting of 14·2$\mu$ OFDM symbols, but the present disclosure is not limited thereto.

In the NR system, a transmitted signal is described by one or more resource grids, consisting of $N_{RB}^\mu N_{sc}^{RB}$ subcarriers, and $2N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology $\mu$ and antenna port p.

FIG. 5 illustrates examples of a resource grid per antenna port and numerology to which a method proposed in the present disclosure is applicable.

Each element of the resource grid for the numerology $\mu$ and the antenna port p is called a resource element and is uniquely identified by an index pair (k,l̄), where k=0, ..., $N_{RB}^\mu N_{sc}^{RB}-1$ is an index on a frequency domain, and l̄=0, ..., $2^\mu N_{symb}^{(\mu)}-1$ refers to a location of a symbol in a subframe. The index pair (k,l) is used to refer to a resource element in a slot, where l=0 ..., $N_{symb}^\mu-1$.

The resource element (k,l̄) for the numerology $\mu$ and the antenna port p corresponds to a complex value $a_{k,l̄}^{(p,\mu)}$. When there is no risk for confusion or when a specific antenna port or numerology is not specified, the indices p and $\mu$ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration $\mu$.

The center of subcarrier 0 of common resource block 0 for the subcarrier spacing configuration μ coincides with "point A". A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, N may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may consist of consecutive resource blocks (RBs) on the frequency axis and may correspond to one numerology (e.g., sub-carrier spacing, CP length, slot/mini-slot duration).

A base station may configure multiple BWPs even within one CC configured to the UE. As one example, a BWP occupying a relatively small frequency domain may be configured in a PDCCH monitoring slot, and a PDSCH indicated in PDCCH may be scheduled onto a BWP larger than this. Alternatively, when UEs are concentrated on a specific BWP, some UEs may be configured with other BWPs for load balancing. Alternatively, considering frequency domain inter-cell interference cancellation between neighboring cells, a partial spectrum of the entire bandwidth may be excluded and both BWPs may be configured even in the same slot. That is, the base station may configure at least one DL/UL BWP to the UE associated with the wideband CC and may activate at least one DL/UL BWP (by L1 signaling or MAC CE or RRC signaling) among configured DL/UL BWP(s) at a specific time, and switching may be indicated to another configured DL/UL BWP (by L1 signaling or MAC CE or RRC signaling) or a timer value may be switched to the fixed DL/UL BWP when a timer value is expired based on a timer. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 6 illustrates physical channels and general signal transmission. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 are used for scheduling of PUSCH in one cell, and DCI format 1_0 and DCI format 1_1 are used for scheduling PDSCH in one cell. Information included in DCI format 0_0 is CRC scrambled by C-RNTI or CS-RNTI or MCS-C-RNTI and transmitted. And, DCI format 0_1 is used for reserving PUSCH in one cell. Information included in DCI format 0_1 may be CRC scrambled by C-RNTI or CS-RNTI or SP-CSI-RNTI or MCS-C-RNTI and transmitted. DCI format 1_0 is used for scheduling PDSCH in one DL cell. Information included in DCI format 1_0 is CRC scrambled by C-RNTI or CS-RNTI or MCS-C-RNTI and transmitted. DCI format 1_1 is used for scheduling PDSCH in one cell. Information included in DCI format 1_1 is CRC scrambled by C-RNTI or CS-RNTI or MCS-C-RNTI and transmitted. DCI format 2_1 is used to inform PRB(s) and OFDM symbol(s) that the UE may assume that transmission is not intended. The following information included in DCI format 2_1 such as preemption indication 1, preemption indication 2, . . . , preemption indication N is CRC scrambled by INT-RNTI and transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Physical Uplink Control Channel (PUCCH)

A PUCCH supports multiple formats, and the PUCCH formats may be classified based on a symbol duration, a payload size, and multiplexing. The following Table 5 represents an example of the PUCCH format.

TABLE 5

| Format | PUCCH length in OFDM symbols | Number of bits | Usage | Others |
| --- | --- | --- | --- | --- |
| 0 | 1-2 | ≤2 | 1 | Sequence selection |
| 1 | 4-14 | ≤2 | 2 | Sequence modulation |
| 2 | 1-2 | >2 | 4 | CP-OFDM |
| 3 | 4-14 | >2 | 8 | DFT-s-OFDM (no UE multiplexing) |
| 4 | 4-14 | >2 | 16 | DFT-s-OFDM (Pre DFT OCC) |

The PUCCH formats of Table 5 may be roughly divided into (1) a short PUCCH and (2) a long PUCCH. The PUCCH formats 0 and 2 may be included in the short PUCCH, and the PUCCH formats 1, 3 and 4 may be included in the long PUCCH. A UE transmits one or two PUCCHs via a serving cell on different symbols within one slot. If the UE transmits two PUCCHs in one slot, at least one of the two PUCCHs has a structure of a short PUCCH. That is, in one slot, (1) the transmission of a short PUCCH and a short PUCCH is possible and (2) the transmission of a long PUCCH and a short PUCCH is possible, but (3) the transmission of a long PUCCH and a long PUCCH is impossible.

DL and UL Transmission/Reception Operation

Downlink Transmission/Reception Operation

FIG. 7 illustrates an example of a downlink transmission and reception operation.

Referring to FIG. 7, the eNB may schedule downlink transmission such as the frequency/time resource, the transport layer, an downlink precoder, the MCS, etc., (S701). Specifically, the eNB may determine a beam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 11 may be used for the downlink scheduling and specifically, DCI format 11 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

In particular, according to each state/index indicated in an antenna port(s) field, the number of DMRS ports may be scheduled, and single-user (SU)/Multi-user (MU) transmission scheduling is also available. In addition, the TCI field consists of 3 bits, and the QCL for the DMRS may be dynamically indicated by indicating a maximum of 8 TCI states according to the TCI field value. The UE may receive downlink data from the base station on the PDSCH (S703). When the UE detects a PDCCH including DCI format 1_0 or 1_1, the UE may decode the PDSCH according to an indication by the corresponding DCI.

Here, when the UE receives a PDSCH scheduled by DCI format 11, a DMRS configuration type may be configured by higher layer parameter "dmrs-Type" in the UE and the DMRS configuration type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

A transport block may be made up of one or more code block groups (CBG), and one CBG may be made up of one or more code blocks (CB). Also, in an NR system, data transmission and reception may be performed for each CB/CBG as well as for each transport block. Accordingly, ACK/NACK transmission and retransmission per CB/CBG also may be possible. The UE may receive information on CB/CBG from the base station through a DCI (e.g., DCI format 0_1 and DCI format 1_1). Also, the UE may receive information on a data transmission unit (e.g., TB/CB/CBG) from the base station.

UL Transmission/Reception Operation

FIG. 8 illustrates an example of an uplink transmission and reception operation. Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above. And, the UE may receive, from the eNB, DCI for uplink scheduling (i.e., including scheduling information of the PUSCH) on the PDCCH (S802).

DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S803). When the UE detects a PDCCH including DCI format 0_0 or 0_1, the UE may transmit the corresponding PUSCH according to the indication by the corresponding DCI. two schemes (Codebook based transmission scheme and non-codebook based transmission scheme) are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 00, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 01, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

In relation to the beam indication, the UE may be RRC-configured with a list for up to M candidate Transmission Configuration Indication (TCI) states for the purpose of at least Quasi Co-location (QCL) indication, where M may be 64.

Each TCI state may be configured in one RS set. IDs of each DL RS for the purpose of spatial QCL (QCL Type D) at least in the RS set may refer to one of DL RS types such as SSB, P-CSI RS, SP-CSI RS, and A-CSI RS. Initialization/ update for the ID of DL RS(s) in the RS set that are used at least for the purpose of spatial QCL may be performed at least by explicit signaling.

The TCI-State IE associates one or two DL reference signals (RS) with a corresponding quasi co-location (QCL) type. The TCI-State IE may include parameters such as bwp-Id/reference signal/QCL type.

A bwp-Id parameter indicates DL BWP where RS is positioned, a cell parameter indicates a carrier where RS is positioned, a reference signal parameter indicates a reference antenna port(s) that is a source of quasi co-location for a corresponding target antenna port(s), or a reference signal including it. The target antenna port(s) may be CSI-RS, PDCCH DMRS, or PDSCH DMRS. For example, a corresponding TCI state ID may be indicated to NZP CSI-RS resource configuration information to indicate QCL reference RS information for NZP CSI-RS. As another example, a TCI state ID may be indicated in each CORESET configuration to indicate QCL reference information for the PDCCH DMRS antenna port(s). As another example, a TCI state ID may be indicated through DCI to indicate QCL reference information for the PDSCH DMRS antenna port(s).

The descriptions (e.g., 3GPP system, frame structure, DL and UL transmission and reception, etc.) given above may be applied/used in combination with methods and/or embodiments proposed in the present disclosure or may be supplemented to clarify technical features of the methods proposed in the present disclosure. In the present disclosure, the presence of a slash "/" may indicate that all or only some of words or phrases separated by/are included.

Hybrid Automatic Repeat and Request (HARQ)

In relation to a UE operation for reporting control information, a HARQ-ACK operation is described. HARQ in NR may have the following features.

1) 1-bit HARQ-ACK feedback may be supported per transport block (TB). Here, an operation of one DL HARQ process is supported for some UEs, whereas operations of one or more DL HARQ processes are supported for a given UE.

2) A UE may support a set of minimum HARQ processing times. Here, the minimum HARQ processing time means a minimum time required for the UE ranging from DL data from reception from a base station to corresponding HARQ-ACK transmission timing. In relation this, two UE processing times N1 and K1 may be defined depending on (1) symbol granularity and (2) slot granularity. First, from a UE perspective, N1 denotes the number of OFDM symbols required for UE processing from the last of PDSCH reception to the fastest start of corresponding HARQ-ACK transmission. The N1 may be defined as in the following Tables 6 and 7 depending on OFDM numerology (i.e., subcarrier spacing) and a DMRS pattern.

TABLE 6

| Configuration | HARQ Timing Parameter | Units | 15 KHz SCS | 30 KHz SCS | 60 KHz SCS | 120 KHz SCS |
|---|---|---|---|---|---|---|
| Front-loaded DMRS only | N1 | Symbols | 8 | 10 | 17 | 20 |
| Front-loaded DMRS only + additional DMRS | N1 | Symbols | 13 | 13 | 20 | 24 |

TABLE 7

| Configuration | HARQ Timing Parameter | Units | 15 KHz SCS | 30 KHz SCS | 60 KHz SCS |
|---|---|---|---|---|---|
| Front-loaded DMRS only | N1 | Symbols | 3 | 4.5 | 9(FR1) |
| Front-loaded DMRS only + additional DMRS | N1 | Symbols | [13] | [13] | [20] |

Further, K1 may denote the number of slots from a slot of a PDSCH to a slot of corresponding HARQ-ACK transmission. FIG. 9 illustrates an example of HARQ-ACK timing K1. In FIG. 9, K0 denotes the number of slots from a slot with DL grant PDCCH to a slot with corresponding PDSCH transmission, and K2 denotes the number of slots from a slot with UL grant PDCCH to a slot with corresponding PUSCH transmission. That is, K0, K1, and K2 may be arranged briefly as in Table 8 below.

TABLE 8

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

Slot timing between A and B is indicated by a field of DCI from a set of the values. Further, NR supports a different minimum HARQ processing time between UEs. The HARQ processing time includes a delay between DL data reception timing and corresponding HARQ-ACK transmission timing and a delay between UL grant reception timing and corresponding UL data transmission timing. A UE transmits a capability of its minimum HARQ processing time to a base station. An asynchronous and adaptive DL HARQ is supported in at least enhanced Mobile Broadband (eMBB) and ultra-reliable low latency (URLLC). From a UE perspective, in a time domain, HARQ ACK/NACK feedback for multiple DL transmissions may be transmitted in one UL data/control region. Timing between DL data reception and corresponding positive acknowledgement is indicated by a field within DCI from a set of values, and the set of values is configured by higher layer. The timing is defined for a case where at least the timing is not known to the UE.

Multiple Transmission and Reception Point (TRP)-Related Operation

The coordinated multi point (CoMP) technique is a scheme in a plurality of base stations exchange (e.g., use X2 interface) or utilize channel information (e.g., RI/CQI/PMI/LI, etc.) fed back from the user equipment (UE) to perform cooperative transmission with the UE, thereby effectively controlling interference. According to the scheme used, the cooperative transmission may be divided into joint transmission (JT), coordinated scheduling (CS), coordinated beamforming (CB), dynamic point selection (DPS), dynamic point blacking (DPB), and the like.

Non-coherent joint transmission (NCJT) may refer to cooperative transmission that does not consider interference (that is, with no interference). For example, the NCJT may be a scheme in which a base station(s) transmits data to one UE through multiple TRPs by using the same time resource and frequency resource. In this scheme, the multiple TRPs of the base station(s) may be configured to transmit data to UE through different layers by using different demodulation reference signal (DMRS) ports. In other words, the NCJT may correspond to a transmission scheme in which transmission of a MIMO layer(s) from two or more TRPs is performed without adaptive precoding between the TRPs.

The NCJT may be categorized into fully overlapped NCJT, in which time and frequency resources used for transmission by each base station (or TRP) are fully overlapped, and partially overlapped NCJT, in which time and frequency resources used for transmission by each base station (or TRP) are partially overlapped. This is only for convenience of explanation in the present disclosure, and it is needless to say that, in the embodiments and methods to be described below, the above-mentioned terms can be replaced with other terms with the same technical meanings. For example, in the case of partially overlapped NCJT, both data of a first base station (e.g., TRP 1) and data of a second base station (e.g., TRP 2) may be transmitted in some of the time resources and/or frequency resources, and data of only one of the first and second base stations may be transmitted in the remaining time resources and/or frequency resources.

TRP transmits data scheduling information to an NCJT receiving UE as DCI (Downlink Control Information). From the perspective of downlink control information (DCI) transmission, M-TRP (multiple TRP) transmission may be divided into i) M-DCI (multiple DCI) based M-TRP transmission in which each TRP transmits a different DCI and ii) S-DCI (single DCI) based M-TRP transmission in which one TRP transmits DCI.

Firstly, the single DCI based MTRP scheme will be described. In the single DCI based MTRP scheme in which a representative TRP transmits scheduling information for data transmitted by itself and data transmitted by another TRP through one DCI, MTRPs cooperatively transmit one common PDSCH and each TRP participating in the cooperative transmission spatially divides the corresponding PDSCH into different layers (i.e., different DMRS ports). In other words, MTRPs transmit one PDSCH but each TRP transmits only some of multiple layers of the PDSCH. For example, when 4-layer data is transmitted, TRP 1 transmits 2 layers, and TRP 2 transmits the remaining 2 layers to the UE.

In this case, scheduling information for the PDSCH is indicated to the UE through one DCI, and the corresponding DCI indicates which DMRS port uses information of which QCL RS and QCL type (which is different from conventionally indicating the QCL RS and TYPE that are commonly applied to all DMRS ports indicated by the DCI). That is, M TCI states (M=2 for 2 TRP cooperative transmission) are indicated through the TCI field in the DCI, and the QCL RS and type are identified by using M TCI states which are different for M DMRS port groups. Also, DMRS port information may be indicated by using a new DMRS table.

As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

Secondly, the multiple DCI based MTRP method will be described. MTRPs transmit different DCIs and PDSCHs, respectively (the UE receives N DCIs and N PDSCHs from N TRPs), and the corresponding PDSCHs are transmitted by (partially or wholly) overlapping on different time resources. The corresponding PDSCHs are transmitted through different scrambling IDs, and the corresponding DCIs may be transmitted through Coresets belonging to different Coreset groups (A coreset group may be identified as an index defined in the coreset configuration of each Coreset. For example, if Coresets 1 and 2 are set to index=0 and Coresets 3 and 4 are set to index=1, Coresets 1 and 2 belong to Coreset group 0 and Coresets 3 and 4 belong to Coreset group 1. If no index is defined for a coreset, this may be interpreted as index=0). If multiple scrambling IDs are set in one serving cell or two or more coreset groups are set, the UE may know that data is received by multiple DCI-based MTRP operation.

For example, the single DCI based MTRP scheme or the multiple DCI based MTRP scheme may be indicated to the UE via separate signaling. As an example, when a plurality of CRS patterns are indicated to the UE for MTRP operation for one serving cell, PDSCH rate matching for CRS may be different depending on this MTRP operation is a single DCI based MTRP operation or a multiple DCI based MTRP operation.

The base station described in this disclosure may be a generic term for an object that transmits/receives data to and from UE. For example, the base station described herein may be a concept including one or more transmission points (TPs), one or more transmission and reception points (TRPs), and the like. For example, multiple TPs and/or multiple TRPs described herein may be included in one base station or included in multiple base stations. In addition, the TP and/or TRP may include a panel of a base station, a transmission and reception unit, and the like.

In addition, the TRP described in this disclosure means an antenna array having one or more antenna elements available in a network located at a specific geographical location in a specific area. Although this disclosure is described with respect to "TRP" for convenience of explanation, the TRP may be replaced with a base station, a transmission point (TP), a cell (e.g., a macro cell/small cell/pico cell, etc.), an antenna array, or a panel and understood and applied as such.

In addition, the CORESET group ID described in this disclosure may refer to an index/identification information (e.g., ID)/indicator, etc. for distinguishing a CORESET configured for/associated with each TRP/panel (or for each TRP/panel). In addition, the CORESET group may be a group/union of CORESETs which is distinguished by the index/identification information (e.g., ID) for distinguishing the CORESET and the CORESET group ID. For example, the CORESET group ID may be specific index information defined in the CORESET configuration. For example, the CORESET group may be configured/indicated/defined by an index defined in the CORESET configuration for each CORESET. The CORESET group ID may be configured/indicated via higher layer signaling (e.g., RRC signaling)/L2 signaling (e.g., MAC-CE)/L1 signaling (e.g., DCI).

For example, ControlResourceSet information element (IE) that is a higher layer parameter is used to configure a time/frequency control resource set (CORESET). For example, the control resource set may be related to detection and reception of downlink control information. Examples of the ControlResourceSet IE may include CORESET related ID (e.g., controlResourceSetID), an index of a CORESET pool for CORESET (e.g., CORESETPoolIndex), time/frequency resource configuration of CORESET, and TCI information related to CORESET. For example, the index of the CORESET pool (e.g., CORESETPoolIndex) may be set to 0 or 1.

For example, it may be indicated/configured so that PDCCH detection for each TRP/panel is performed on a per CORESET group basis. And/or, it may be indicated/configured so that uplink control information (e.g. CSI, HARQ-A/N, SR) and/or uplink physical channel resources (e.g. PUCCH/PRACH/SRS resources) for each TRP/panel are divided on a per CORESET group basis and managed/controlled. And/or, HARQ A/N (process/retransmission) for PDSCH/PUSCH, etc. scheduled for each TRP/panel may be managed on a per CORESET group basis.

M-TRP Transmission Scheme

M-TRP transmission by which multiple (e.g., M) TRPs transmit data to one user equipment (UE) may be divided into two main types of transmission: eMBB M-TRP transmission (or M-TRP eMMB) which is a scheme for increasing a transmission rate and URLLC M-TRP transmission (or M-TRP URLLC) which is a scheme for increasing a reception success rate and reducing latency.

URLLC M-TRP may mean that M-TRPs transmit the same TB (Transport Block) using different resources (e.g., layers/time resources/frequency resources, etc.). A number of TCI state(s) may be indicated by DCI to a UE configured with the URLLC M-TRP transmission scheme, and data received using the QCL reference signal (RS) of each TCI state may be assumed to be the same TB. On the other hand, eMBB M-TRP may mean that M-TRPs transmit different TBs using different resources (e.g., layers/time resources/frequency resources, etc.). A number of TCI state(s) may be indicated by DCI to a UE configured with the eMBB M-TRP transmission scheme, and data received using the QCL RS of each TCI state may be assumed to be different TBs. In relation to at least eMBB M-TRP, each TCI code point within DCI may correspond to 1 or 2 TCI states. If 2 TCI states are activated within one TCI code point, each TCI state for at least DMRS type 1 may correspond to one CDM group.

For example, the UE may decide/determine whether the corresponding M-TRP transmission is URLLC transmission or eMBB transmission since it uses the RNTI configured for MTRP-URLLC and the RNTI configured for MTRP-eMBB, separately. That is, if the CRC masking of the DCI received by the UE is performed using the RNTI configured for the MTRP-URLLC purpose, this may correspond to URLLC transmission, and if the CRC masking of the DCI is performed using the RNTI configured for the MTRP-eMBB purpose, this may correspond to eMBB transmission.

Table 9 shows various schemes that can be considered for URLLC M-TRP transmission. Referring to Table 9, there exist various schemes such as SDM/FDM/TDM.

TABLE 9

To facilitate further down-selection for one or more schemes in RAN1#96bis, schemes tor multi-TRP based URLLC, scheduled by single DCI at least, are clarified as following:
  Scheme 1 (SDM): n (n <= $N_s$) TCI states within the single slot, with overlapped time and
    frequency resource allocation
 Scheme 1a:
    Each transmission occasion is a layer or a set of layers of the same TB, with each layer or layer
    set is associated with one TCI and one set of DMRS port(s).
    Single codeword with one RV is used across all spatial layers or layer sets. From the UE
    perspective, different coded bits are mapped to different layers or layer sets with the same
    mapping rule as in Rel-15.
  Scheme 1b:
    Each transmission occasion is a layer or a set of layers of the same TB, with each layer or layer
    set is associated with one TCI and one set of DMRS port(s).
    Single codeword with one RV is used for each spatial layer or layer set. The RVs corresponding
    to each spatial layer or layer set can be the same or different.
  Scheme 1c:
    One transmission occasion is one layer of the same TB with one DMRS port associated with
    multiple TCI state indices, or one layer of the same TB with multiple DMRS ports associated
    with multiple TCI state indices one by one.
  For Scheme 1a and 1c, the same MCS is applied for all layers or layer sets.
  For scheme 1b, same or different MCS/modulation orders for different layers or layer sets can be
  discussed.
     Scheme 2 (FDM): n (n <= $N_f$) TCI slates within the single slot, with non-overlapped frequency
     resource allocation
  Each non-overlapped frequency resource allocation is associated with one TCI state.
  Same single/multiple DMRS port(s) are associated with all non-overlapped frequency resource
  allocations.
  Scheme 2a:
     Single codeword with one RV is used across full resource allocation. From UE perspective, the
     common RB mapping (codeword to layer mapping) is applied across full resource allocation.
  Scheme 2b:
     Single codeword with one RV is used for each non-overlapped frequency resource allocation.
     The RVs corresponding to each non-overlapped frequency resource allocation can be the same or
     different.
  For scheme 2a, same MCS is applied for all non-overlapped frequency resource allocations
  For scheme 2b, same or different MCS/modulation orders for different non-overlapped frequency
  resource allocations can be discussed.
  Details of frequency resource allocation mechanism for FDM 2a/2b with regarding to allocation
  granularity, time domain allocation can he discussed.
  Scheme 3 (TDM): is (n <= $N_{t1}$) TCI states within the single slot, with on-overlapped time resource
  allocation
       Each transmission occasion of die TB has one TCI and one RV with the time granularity of
       mini-slot.
       All transmission occasion (s) within the slot use a common MCS with same single or multiple
       DMRS port(s),
       RV/TCI state can be same or different among transmission occasions.
       FFS channel estimation interpolation across mini-slots with the same TCI index
  Scheme 4 (TDM): n (n <= $N_{t2}$) TCI states with K (n <= K) different slots.
       Each transmission occasion of the TB has, one TCI and one RV.
       All transmission occasion (s) across K slots use a common MCS with same single or multiple
       DMRS port(s)
       RV/TCI state can he same or different among transmission occasions.
       FFS channel estimation interpolation across slots with the same TCI index Note
that M-TRP/panet based URLLC schemes shall be compared in terms of improved reliability, efficiency, and specification impact.
Note:
Support of number of layers per TRP may be discussed Method for Improving Reliability in Multi-TRPs FIGS. 10A and 10B illustrates an example of a transmission/reception method for improving reliability supported by a plurality of TRPs, and the following two methods may be considered.

The example in FIG. 10A shows that a layer group transmitting the same codeword (CW)/transport block (TB) correspond to different TRPs. That is, the same CW may be transmitted via different layers/layer groups. In this case, a layer group may refer to some kind of layer set made up of one or more layers. As such, the amount of transmission resources increases as the number of layers increases, and this is advantageous in that robust channel coding with a low code rate can be used for TB. In addition, it is expected that the reliability of received signals may be improved based on diversity gain due to different channels from a plurality of TRPs.

The example in FIG. 10B shows an example in which different CWs are transmitted via layer groups corresponding to different TRPs. That is, different CWs may be transmitted through different layers/layer groups. In this case, it may be assumed that TBs corresponding to the first CW (CW #1) and the second CW (CW #2) are the same. Therefore, this can be seen as an example of repeated transmission of the same TB. In the case of FIG. 10B, the code rate corresponding to the TB may be higher than that of (a) of FIG. 9. Still, there is an advantage that a code rate can be adjusted by indicating different redundancy version (RV) values for encoding bits generated from the same TB according to a channel environment, or that a modulation order of each CW may be adjusted.

In FIG. 10A or FIG. 10B, the same TB is repeatedly transmitted via different layer groups, and each layer group is transmitted by different TRPs/panels, thereby increasing the data reception probability, which may be called spatial division multiplexing (SDM)-based URLLC M-TRP transmission. A layer(s) belonging to different layer groups are transmitted through DMRS ports belonging to different DMRS CDM groups, respectively.

In addition, although the above description regarding multiple TRPs has been given with respect to a spatial division multiplexing (SDM) scheme using different layers, it also may be extensively applied to a frequency division multiplexing (FDM) scheme based on different frequency domain resources (e.g., RB/PRB (set)), and/or a time division multiplexing (TDM) scheme based on different time domain resources (e.g., slots, symbols, and sub-symbols).

Hereinafter, in the present disclosure, methods that can be proposed in consideration of cooperative transmission (e.g., NCJT) between multiple base stations (e.g., multiple TPs/TRPs of one or more base stations) and UE will be described. Specifically, the proposal 1 proposes a method of constructing a HARQ-ACK codebook for multi-TRP transmission and a method of determining a resource for transmitting HARQ-ACK information. The proposal 2 proposes, if a specific index corresponding to a CORESET (e.g., CORESET group ID, CORESETPoolIndex, etc.) is not configured, a method of determining the specific index assigned to the CORESET. The proposal 3 proposes a method of extending and applying a compressed semi-static HARQ-ACK codebook generation method to multi-TRP. The proposal 4 proposes a method for transmitting a HARQ-ACK codebook to PUSCH considering multi-TRP transmission (a method for multiplexing HARQ-ACK codebook and PUSCH).

As described above, each TRP may be distinguished based on an index (e.g., CORESETPoolIndex) (or CORESET group ID) of a CORESET pool configured to a CORESET. Although the methods described herein are described based on one or more TP/TRPs of base station(s), the methods may be equally or similarly applied to transmissions based on one or more panels of base station(s).

In the NR standard, two types of Type-1 HARQ-ACK codebook and Type-2 HARQ-ACK codebook are supported. The respective codebook schemes are summarized as below.

For the Type-1 HARQ-ACK codebook, a HARQ-ACK codebook (i.e., a set of HARQ information bits) is defined for one or more candidate PDSCH receptions capable of transmitting HARQ-ACK information to PUCCH/PUSCH to be transmitted in a specific slot (e.g., slot #n). Even if an actual PDSCH transmission is not performed, bit(s) for the corresponding PDSCH reception may be defined in the HARQ-ACK codebook. It is defined that a UE transmits NACK if the UE recognizes that PDSCH transmission is not performed (including the case where the UE fails in PDCCH detection).

For a single occasion for a candidate PDSCH reception, HARQ-ACK information may be configured with 1 bit or 2 bits according to a higher layer parameter, "maxNrofCodeWordsScheduledByDCI" value, representing the maximum number of CWs. If "harq-ACK-SpatialBundlingPUCCH" is configured to the UE, HARQ-ACK information may be configured with 1 bit.

Specifically, if there is an occasion for a candidate PDSCH reception as a response to PDCCH having DCI format 11, and "maxNrofCodeWordsScheduledByDCI" indicates reception of 2 transport blocks, when the UE receives PDSCH including one transport block, i) if "harq-ACK-SpatialBundlingPUCCH" is not configured, the UE may generate HARQ-ACK information associated with a first transport block and NACK for a second transport block, and ii) if "harq-ACK-SpatialBundlingPUCCH" is configured, the UE may generate HARQ-ACK information as ACK for the second transport block.

For the Type-2 HARQ-ACK codebook, based on counter downlink assignment indicator (C-DAI) and total DAI (T-DAI) values indicated in an actually transmitted PDCCH, a codebook to transmit HARQ-ACK information to the same PUCCH/PUSCH is defined. That is, the codebook is constructed based on PDCCH information which is actually transmitted to the UE. If the UE fails in specific PDCCH detection, the UE transmits NACK to a bit for the corresponding PDCCH among the bits defined in the codebook. In this case, the UE may recognize whether the PDCCH detection is failed through C-DAI and T-DAI values.

A value of a C-DAI field within DCI format represents an accumulative number of {serving cell, PDCCH monitoring occasion}-pair(s) of PDSCH reception or SPS PDSCH release associated with the DCI format in which a current serving cell and a current PDCCH monitoring occasion are present. Here, this follows the ascending order of serving cell indexes and then follows the ascending order of the PDCCH monitoring occasions. A value of T-DAI within DCI format represents a total number of {serving cell, PDCCH monitoring occasion}-pair(s) of PDSCH reception or SPS PDSCH release associated with the DCI format in which the current PDCCH monitoring occasion is present.

The two types of codebooks described above have been designed without considering different PDSCH transmissions overlapping in all the time domains, that is, multi-TRP (M-TRP) transmission. Accordingly, if different PDSCH transmissions overlapping in the time domain are overlapped in a time domain and transmitted, a problem may occur specifically in the part of defining a candidate PDSCH reception occasion in the Type-1 HARQ-ACK scheme of the current standard.

The present disclosure proposes a method of solving the problem and constructing a HARQ-ACK codebook considering M-TRP transmission.

<Proposal 1>

A method of constructing a HARQ-ACK codebook considering M-TRP transmission may consider (i) a joint HARQ-ACK codebook scheme, and (ii) a separated HARQ-ACK codebook scheme.

First, a joint HARQ-ACK codebook (or joint ACK/NACK codebook) may mean a method for constructing HARQ-ACK information for different TRPs to a single codebook. This method can reduce PUCCH resources TDMed in an intra/inter slot, and thus can increase resource applicability.

Specifically, a sort of index (e.g., CORESETPoolIndex) that may mean different TRPs may be configured to each CORESET, and a UE may assume that when different indexes are configured to different CORESETs, the different CORESETs correspond to different TRPs. For example, if a first CORESET in which CORESETPoolIndex is 0 and a second CORESET in which CORESETPoolIndex is 1 are configured to the UE, the UE may assume that the first CORESET and the second CORESET correspond to different TRPs (i.e., multiple TRP operations). In this instance, if the joint HARQ-ACK codebook is configured/indicated, HARQ-ACK information for respective PDSCHs scheduled by different PDCCHs received via CORESETs corresponding to different TRPs may be transmitted to a specific TRP via the same uplink resource (e.g., PUCCH, PUSCH, etc.) corresponding to the specific TRP.

Second, a separated HARQ-ACK codebook (or separated ACK/NACK codebook) may mean a method for separately constructing HARQ-ACK information for different TRPs to different codebooks. This method can prevent all of HARQ-ACK information (i.e., ACK/NACK information) from being lost because the UE fails in the joint HARQ-ACK codebook transmission in an environment in which blockage is probable.

Specifically, a sort of index (e.g., CORESETPoolIndex) that may mean different TRPs may be configured to each CORESET, and the UE may assume that when different indexes are set to different CORESETs, the different CORESETs correspond to different TRPs. For example, if a first CORESET in which CORESETPoolIndex is 0 and a second CORESET in which CORESETPoolIndex is 1 are configured to the UE, the UE may assume that the first CORESET and the second CORESET correspond to different TRPs (i.e., multiple TRP operations). In this instance, if the separated HARQ-ACK codebook is configured/indicated, HARQ-ACK information for respective PDSCHs scheduled by different PDCCHs received via CORESETs corresponding to different TRPs may be transmitted to the respective TRPs via different uplink resources (e.g., PUCCH, PUSCH, etc.) corresponding to the different TRPs.

FIGS. 11A and 11B illustrate an example of a method for generating a HARQ-ACK codebook for multiple TRPs (e.g., TRP1, TRP2). FIG. 11A illustrates a joint HARQ-ACK codebook scheme, and FIG. 11B illustrates a separated HARQ-ACK codebook scheme. If a semi-static codebook (or Type-1 HARQ-ACK codebook) is assumed, the HARQ-ACK codebook construction described above may be considered.

Referring to FIG. 11A, in a joint HARQ-ACK codebook, the UE may construct HARQ-ACK information for PDSCH1 from TRP1 and PDSCH2 from TRP2 to one codebook to transmit it to a specific TRP (e.g., TRP1) using the same (i.e., one) PUCCH. Referring to FIG. 11B, in a separated HARQ-ACK codebook, the UE may construct HARQ-ACK information for PDSCH1 to one codebook to transmit it to TRP1 using one PUCCH, and may construct HARQ-ACK information for PDSCH2 to another codebook to transmit it to TRP2 using another PUCCH.

Considering different PDSCH transmissions overlapping in a time domain, the joint HARQ-ACK codebook may consider a size that is more than two times the existing HARQ-ACK codebook. In the present disclosure, for convenience of explanation, this (i.e., a codebook with the size greater than the existing HARQ-ACK codebook) is referred to as an 'extended codebook'. In the extended codebook, HARQ-ACK information corresponding to each bit may be defined according to a specific rule. In the operation, a payload size which is a reference when the UE determine a PUCCH resource set for transmitting the HARQ-ACK information may be based on a size of the extended codebook.

For example, if the joint HARQ-ACK codebook is indicated/configured, a codebook may be defined to a size that is two times the existing HARQ-ACK codebook. The UE may construct each codebook per HARQ-ACK information (i.e., ACK/NACK(s)) of PDSCH(s) scheduled by PDCCH(s) detected from CORESETs having the same CORESETPoolIndex, and then may construct a codebook with a size that is two times the existing HARQ-ACK codebook through concatenation of two codebooks.

It is apparent that an example of the joint HARQ-ACK codebook construction can also be applied for the joint HARQ-ACK codebook construction even if there is no separate description in the proposals below.

The base station may configure dynamically or semi-statically a specific codebook scheme (i.e., joint HARQ-ACK codebook or separated HARQ-ACK codebook) to the UE. Hereinafter, examples of a method of configuring the specific codebook scheme are described in detail.

Embodiment 1

A method of defining a new field in DCI may be considered in order to explicitly configure/indicate a specific codebook scheme. A joint HARQ-ACK codebook operation or a separated HARQ-ACK codebook operation may be configured/indicated to a UE through the field.

For example, 1-bit field may be defined in DCI. The UE may perform a separated HARQ-ACK codebook scheme if 0 is indicated/configured via 1-bit field, and the UE may perform a joint HARQ-ACK codebook scheme if 1 is indicated/configured via 1-bit field. Alternatively, the UE may perform the joint HARQ-ACK codebook scheme if 0 is indicated/configured via 1-bit field, and the UE may perform the separated HARQ-ACK codebook scheme if 1 is indicated/configured via 1-bit field.

A field in DCI (e.g., 1-bit field) for configuring/indicating a specific codebook scheme may be included in all of DCIs that schedule PDSCH to the UE or may be included only in specific DCI.

In addition, the method of using the 1-bit field (i.e., 0 or 1) is merely an example for the convenience of description and does not limit the technical scope of the present disclosure. Accordingly, it is understood that the present disclosure can be extendedly applied even if methods described below configure/indicate a joint HARQ-ACK codebook and a separated HARQ-ACK codebook using N-bit field (where N is a natural number), i.e., two or more states.

If the UE is configured/indicated with the separated HARQ-ACK codebook scheme (e.g., 1-bit field is set to 0), the UE may construct a separated codebook according to a specific rule. As an example of the specific rule, a specific index value within a predetermined range may be set to each CORESET, and each codebook may be constructed per ACK/NACK(s) of PDSCH(s) scheduled by PDCCH(s) detected from CORESETs having the same index (e.g., CORESET group ID, HARQ codebook group ID). In other words, HARQ-ACK information of PDSCH scheduled by PDCCH detected from CORESETs having the same CORE-SETPoolIndex may construct each HARQ-ACK codebook per CORESETPoolIndex.

If the UE is configured/indicated with the joint HARQ-ACK codebook scheme (e.g., 1-bit field is set to 1), the UE may construct HARQ-ACK information to one codebook. In this instance, constructing one codebook may mean that HARQ-ACK information for PDSCH(s) transmitted from different TRPs constructs one codebook, and the one codebook is transmitted to a base station (e.g., one TRP of the TRPs that transmit the PDSCH(s)) via the same (i.e., one) PUCCH resource. As described above, the different TRPs may be distinguished based on different values of CORE-SETPoolIndex. If CORESETs having the different values of CORESETPoolIndex are configured, the UE may recognize multiple TRP operations. That is, the different TRPs may be represented as a situation in which different indexes (e.g., CORESET group ID, CORESETPoolIndex, HARQ codebook group ID) are mapped to CORESETs. In this case, there is a feature that one HARQ-ACK codebook may be constructed if a sort of index (e.g., CORESET group ID, CORESETPoolIndex, HARQ codebook group ID) configured to the CORESET, on which the PDCCH scheduling the PDSCH is transmitted, is different.

Embodiment 2

Using the existing field in DCI, a specific codebook scheme (e.g., a joint HARQ-ACK codebook operation or a separated HARQ-ACK codebook operation) may be implicitly configured/indicated. If the existing field is used, a separate bit field for selecting/configuring a joint HARQ-ACK codebook and a separated HARQ-ACK codebook may not be defined. Therefore, there is an advantage in that signalling overhead of control information can be reduced.

Embodiment 2-1

For example, a method of using a PUCCH resource indicator (PRI) field in DCI may be considered. The PRI field may be used to indicate uplink resources for feeding back HARQ-ACK information. If the same PRI value at different TRPs is indicated to a UE, it may be implicitly interpreted as that the same resource should be used. Therefore, it may be seen to be suitable for this proposal method.

For example, if PRIs indicated to the UE via different PDCCHs scheduling respective PDSCHs are the same, the UE may construct the joint HARQ-ACK codebook for the corresponding respective PDSCHs, and if the PRIs are different, the UE may construct the separated HARQ-ACK codebook based on an index (e.g., CORESET group ID, CORESETPoolIndex, HARQ codebook group ID) configured to the CORESET. In other words, if the PRIs indicated to the UE on different PDCCHs scheduling the respective PDSCHs are the same, the UE may recognize that the same PUCCH resource is indicated at different TRPs and may interpret this as a meaning of transmitting the joint HARQ-ACK codebook using the same PUCCH resource.

In the method of the embodiment 2-1, if the UE fails to receive a specific PDCCH among multiple PDCCHs, there is a disadvantage in that the UE interprets that the separated HARQ-ACK codebook is indicated although the base station has indicated the joint HARQ-ACK codebook, and the UE may perform a wrong PUCCH transmission. As a method for compensating this, the following embodiment 2-2 may be considered.

Embodiment 2-2

As in the above-described Embodiment 2-1, a PRI field in DCI is used, and a range of a value indicated through the PRI field is set. If PRI value(s) indicated to a UE on different PDCCHs are included in a specific range, a joint HARQ-ACK codebook may be constructed, and if the PRI value(s) exceed the specific range (i.e., if the PRI value(s) are value(s) beyond the specific range), a separated HARQ-ACK codebook may be constructed. Hence, even if the UE fails to receive a specific PDCCH of multiple PDCCHs transmitted to the UE and is unable to compare PRI values indicated from two PDCCHs, the UE can recognize a codebook construction scheme without any ambiguity.

For example, it may be assumed that the specific range of the PRI value capable of indicating the joint HARQ-ACK codebook is set to 000 to 011. If the PRI value has one value among 000, 001, 010, and 011 and is indicated to the UE, the UE may recognize that the joint HARQ-ACK codebook is indicated. On the other hand, if one value among 100, 101, 110, and 111 that are not included in the above range is indicated to the UE, the UE may recognize that the separated HARQ-ACK codebook is indicated.

In the above example, when PDCCH #1 indicates PRI 001, and PDCCH #2 indicates PRI 001, if the UE recognizes that the PRI value is a value within the specific range by receiving the PDCCH #1 even if the UE fails to receive the PDCCH #2, the UE may construct the joint HARQ-ACK codebook.

In the present proposal, the specific range of the PRI value capable of indicating the joint HARQ-ACK codebook may be defined according to a fixed rule between a base station and the UE, or information for the specific range (i.e., specific value) may be configured/delivered to the UE via higher layer signalling.

Embodiment 2-3

A 'reserved' value of a specific DCI field which has been already defined may be used. For example, a separated ACK/NACK codebook or joint ACK/NACK codebook construction may be configured/indicated using the reserved value of the DCI field for a DMRS port indication.

Embodiment 2-4

A separated ACK/NACK codebook or joint ACK/NACK codebook construction may be configured/indicated by indicating a specific combination using a plurality of DCI fields which have been already defined. For example, the operation may be performed using a specific combination of a DCI field for a DMRS port indication and a DCI field (i.e., MCS, NDI, RV) value for a TB information indication.

At different TRPs performing multi-TRP transmission, different DCIs may be transmitted to a UE (e.g., the above-described multiple DCI based MTRP scheme). It is assumed that one of the joint HARQ-ACK codebook or the separated HARQ-ACK codebook is indicated/configured based on the methods described in the embodiments of the proposal 1.

For example, if the joint HARQ-ACK codebook is indicated via the DCI, a resource on which a PUCCH including HARQ-ACK information is transmitted may be determined as below. The order may be defined according to a timing when the DCI is transmitted/an index (e.g., CORESET group ID, CORESETPoolIndex, HARQ codebook group ID) configured to a CORESET in which the corresponding DCI is transmitted. In this case, based on the specific order, for example, the DCI may be transmitted in the latest slot in the order of time, and in the case of the same slot, it may be defined that the DCI with a lowest (or greatest) index configured to the CORESET and a PUCCH resource indicated by a specific DCI are used.

When the UE calculates PUCCH resources, the UE may first determine a PUCCH resource set. In this case, as described above, considering different PDSCH transmissions overlapped in a time domain, the joint HARQ-ACK codebook may consider a size that is more than two times the existing HARQ-ACK codebook, and finally, a final PUCCH resource may be determined through a PRI value indicated via the DCI.

For example, if the separated HARQ-ACK codebook is indicated via the DCI, a resource on which a PUCCH including HARQ-ACK information is transmitted may be determined as below. If the separated HARQ-ACK codebook is indicated via the DCI, a timing when the DCI is transmitted/an index (e.g., CORESET group ID, CORESETPoolIndex, HARQ codebook group ID) configured to a CORESET in which the corresponding DCI is transmitted may become a reference. For example, a PUCCH resource indicated by the DCI transmitted in the latest slot in the order of time may be used, but the last DCI for determining a PUCCH resource may be determined per index configured to a CORESET.

When the UE calculates PUCCH resources, the UE may first determine a PUCCH resource set. In this case, a payload size not considering different PDSCH transmissions overlapped in a time domain may be considered, and finally, a final PUCCH resource may be determined through a PRI value indicated via the corresponding DCI. In this case, if the separated HARQ-ACK codebook is configured/indicated, and if PUCCH resources, in which an index (e.g., CORESETPoolIndex) configured to a CORESET is indicated/configured via different DCIs detected in other CORESET, overlap each other, the UE may not perform (may drop) transmission for a specific resource (e.g., a resource indicating/indicated via DCI detected in a CORESET corresponding to a smaller or greater index) among different PUCCH resources.

Embodiment 3

One scheme of a joint HARQ-ACK codebook or a separated HARQ-ACK codebook may be indicated/determined depending on whether PUCCH resources indicated by different PDCCHs scheduling respective PDSCHs are the same. The fact that the PUCCH resources are the same may mean that parameters for PUCCH transmission, such as time/frequency resources for PUCCH transmission and/or PUCCH formats, are the same. For example, the fact that time/frequency resources are the same may mean that time resources, frequency resources, or both (time and frequency resources) are the same.

For example, after a UE assumes a joint HARQ-ACK codebook, the UE may calculate (or determine) a PUCCH resource indicated by each PDCCH. Thereafter, if the PUCCH resources indicated by different PDCCHs scheduling respective PDSCHs are the same, the UE may construct HARQ-ACK information for PDSCHs scheduled by the different PDCCHs as the joint HARQ-ACK codebook.

On the other hand, if the PUCCH resources indicated by different PDCCHs scheduling respective PDSCHs are different, the UE may construct HARQ-ACK information for PDSCHs scheduled by the different PDCCHs as the separated HARQ-ACK codebook based on an index (e.g., CORESET group ID, HARQ codebook group ID) configured to a CORESET. In this case, a PUCCH resource to transmit each codebook may be calculated (or determined) again (by the UE) by assuming the separated HARQ-ACK codebook.

In the Embodiment 3, if the UE assumes the joint HARQ-ACK codebook, a payload size when determining a PUCCH resource set may be based on the size of 'extended codebook' as described above. On the other hand, if the UE assumes the separated HARQ-ACK codebook since PUCCH resources indicated from the different PDCCHs are different, and calculates again PUCCH resources, a size of the existing codebook, that is, the existing codebook size before extension may be referenced.

Embodiment 4

A method of semi-statically constructing a joint HARQ-ACK codebook or a separated HARQ-ACK codebook may be considered according to a backhaul situation between TRPs. To this end, a specific scheme of the joint HARQ-ACK codebook or the separated HARQ-ACK codebook may be configured to a UE through a higher layer parameter (e.g., L1 (layer 1) parameter).

For example, a specific HARQ-ACK codebook scheme may be configured/indicated based on 'PhysicalCellGroupConfig' field used to configure a cell-group specific L1 parameter. In other words, a parameter (e.g., ackNackFeedbackMode) for configuring a HARQ-ACK codebook scheme may be included in the 'PhysicalCellGroupConfig' field, and the joint HARQ-ACK codebook or the separated HARQ-ACK codebook may be indicated through the parameter. For example, the parameter may also be configured when a plurality of different CORESETPoolindex is present in ControlResourceSet.

As described above, the UE configured with the joint HARQ-ACK codebook scheme (mode) may consider a codebook with a size more than two times the existing HARQ-ACK codebook considering different PDSCH transmissions overlapped in a time domain, and HARQ-ACK information corresponding to each bit in the extended codebook may be defined according to a specific rule.

For example, if the joint HARQ-ACK codebook is indicated/configured, a codebook may be defined to a size that is two times the existing HARQ-ACK codebook. The joint HARQ-ACK codebook with a size that is two times the one may be constructed by constructing different codebooks in the order of index (e.g., CORESETPoolIndex) configured in a CORESET, and then concatenating two codebooks. A payload size which is a reference when the UE determines a PUCCH resource set for transmitting HARQ-ACK information may be based on the size of the extended codebook.

If the separated HARQ-ACK codebook is configured semi-statically, when PUCCH resources indicated by different DCIs received from a CORESET corresponding to different indexes (e.g., CORESETPoolIndex) are TDMed (time domain multiplexing) in the same slot and/or when they are transmitted in different slots, the UE may perform a separated HARQ-ACK codebook operation that constructs respective codebooks for different indexes. That is, the UE may construct a HARQ-ACK codebook per CORESET-PoolIndex. On the other hand, if PUCCH resources indicated by different DCIs received from a CORESET corresponding to different indexes (e.g., CORESETPoolIndex) are overlapped in the same slot, the UE may not transmit (drop) the PUCCH resource indicated by the DCI received from a CORESET corresponding to a specific index. Alternatively, the UE capable of simultaneously transmitting different PUCCH resources which are overlapped depending on a value (e.g., UE capability) that the UE reports to a base station may transmit the respective separated HARQ-ACK codebooks corresponding to different indexes via different PUCCH resources at the same time.

If the joint HARQ-ACK codebook is configured semi-statically, when PUCCH resources indicated by different DCIs received from a CORESET corresponding to different indexes (e.g., CORESETPoolIndex) are TDMed within the same slot and/or when they are overlapped within the same slot, all of HARQ-ACK information corresponding to different indexes may be transmitted to the base station via a specific PUCCH resource at one time.

For example, the specific PUCCH resource on which the HARQ-ACK information is transmitted may use a PUCCH resource indicated by DCI transmitted lastly in the order of time, and/or a PUCCH resource indicated by DCI received through a CORESET corresponding to a specific index (e.g., lowest index or highest index), and/or a PUCCH resource indicated by the DCI corresponding to a specific cell (e.g., a cell corresponding to a lowest cell ID or a highest cell ID).

For example, as described above in the Embodiment 2, etc., a PUCCH resource may be determined depending on a PUCCH resource indicator (PRI) field value indicated via a specific DCI. If the UE receives different DCIs from CORESETs corresponding to different indexes (e.g., CORESETPoolIndex), the order of DCIs may be determined based on i) a time at which the DCI is transmitted, ii) an index (e.g. CORESET group ID, CORESETPoolIndex) configured to the CORESET to which the corresponding DCI is transmitted, and iii) a cell index (or ID). The time at which the DCI is transmitted may mean an index of a monitoring occasion related to a channel (e.g., PDCCH) on which the DCI is transmitted. The PUCCH resource may be determined depending on the PRI field value of the specific DCI determined based on the order of DCI. For example, the order of DCI is transmitted in the last slot in the order of time in one cell, and if the slots in which the DCI is transmitted are the same (or, if monitoring occasions of the DCI are the same), it may be defined to use a PUCCH resource indicated by a DCI having a greatest index configured to the CORESET.

For example, if different DCIs are received from CORESETs corresponding to different indexes (e.g., CORESETPoolIndex), a PUCCH resource for HARQ-ACK information transmission may be determined through a PRI field of a last DCI among the received DCIs. The received DCIs may be indexed in ascending order of serving cell index for the same PDCCH monitoring occasion, and then may be indexed according to an index of the PDCCH monitoring occasion. The DCIs within one serving cell in the same PDCCH monitoring occasion may be indexed based on a specific index (e.g., CORESETPoolIndex) of the CORESET. For example, a DCI received from a CORESET in which a value of CORESETPoolIndex is 0 or is not set may be indexed earlier than a DCI received from a CORESET in which a value of CORESETPoolIndex is 1. The last DCI may be determined according to the index order.

As a detailed example, if respective DCIs are received from a first CORESET in which the value of CORESET-PoolIndex within one servicing cell in the same PDCCH monitoring occasion corresponds to 0 and a second CORESET in which the value of CORESETPoolIndex corresponds to 1, HARQ-ACK information may be transmitted using a PUCCH resource indicated by a PRI field value of a DCI received from the second CORESET.

On the other hand, if PUCCH resources indicated by different DCIs received from CORESET corresponding to different indexes (e.g., CORESETPoolIndex) and/or the same index are TDMed in the same slot and/or are transmitted in different slots, each of PDSCHs scheduled by the corresponding DCI may be transmitted to the base station via different PUCCH resources indicated via corresponding DCI.

<Proposal 2>

As described above, in a separated HARQ-ACK codebook scheme constructing a HARQ-ACK codebook corresponding to each TRP in relation to a multi-TRP operation, a specific index is configured per CORESET, and a different HARQ-ACK codebook may be constructed per index. As described above, a specific index configured per CORESET may mean a CORESET group ID (or index) associated with the CORESET or an index of a CORESET pool.

For example, HARQ-ACK information for a PDSCH scheduled by PDCCHs transmitted/received through CORESET(s) configured with index 1 may be constructed as one codebook, and HARQ-ACK information for a PDSCH scheduled by PDCCHs transmitted through CORESET(s) configured with index 2 may be constructed as another codebook. In addition, the method of using the index 1/2 is merely an example for the convenience of description, and does not limit the technical scope of the present disclosure. Accordingly, it is understood that the present disclosure can be extendedly applied even if methods described below configure/indicate a joint HARQ-ACK codebook or a separated HARQ-ACK codebook using N or more indexes that may be configured (or mapped) for a CORESET.

The above-described method should be applicable even if multiple cells (e.g., Cell #1/Cell #2) are defined. In this case, a case may also be considered, in which a single TRP or multi-TRP configuration is different for each cell. For example, only a single TRP transmission may be considered in Cell #1, and a multi-TRP transmission may be considered in Cell #2. In this case, different specific indexes may be configured for the separated HARQ-ACK codebook construction for each CORESET defined in Cell #2, but a separate specific index may not be configured for each CORSET since a single TRP is assumed in Cell #1. That is, the CORESET may be distinguished through a specific index in a specific cell (e.g., Cell #1), but there may occur a situation in which there is no criterion for distinguishing the CORESET because a specific index is not mapped to the CORESET in another cell (e.g., Cell #2). In this case, when constructing a HARQ-ACK codebook from a UE perspective, an ambiguity may occur from a perspective of multiple cells.

As a method for solving the problem, if a specific index (e.g., CORESET group ID, CORESETPoolIndex, HARQ codebook group ID) is mapped to a CORESET in a specific cell of multiple cells configured to the UE and there is no index mapped to a CORESET in another specific cell, it may be pre-defined/pre-configured so that the UE assumes that a specific index (e.g., lowest index or highest index) is mapped among the indexes mapped to a CORESET defined in another cell for a CORESET in which a mapped index does not exist.

First Example

The following situation may be assumed to describe a method of the proposal 2. It may be assumed that Pcell and Scell #1 to Scell #4 are configured, and 5 CORESETs (i.e., CORESET #0 to CORESET #4) are present for each cell.
- Pcell: CORESET #0/#1/#2/#3/#4 without index
- Scell #1: Index 0-CORESET #0/#1/#2, Index 1-CORESET #3/#4
- Scell #2: CORESET #0/#1/#2/#3/#4 without index
- Scell #3: CORESET #0/#1/#2/#3/#4 without index
- Scell #4: Index 0-CORESET #0/#1/#2, Index 1-CORESET #3/#4

In the above example, Pcell, Scell #2 and Scell #3 assume a single TRP transmission and represent that a separate index is not mapped to a CORESET. On the other hand, Scell #1 and Scell #4 perform a multi-TRP transmission and represent that a specific index is mapped to each CORESET (e.g., index 0 is configured to CORESET #0 to CORESET #2, and index 1 is configured to CORESET #3 and CORESET #4). In the example above, in a cell (e.g., Pcell, Scell #2, and Scell #3) in which any index is not mapped in each CORESET, an ambiguity may occur from a UE perspective when a HARQ-ACK codebook is constructed. In this case, the UE may assume that a specific index of indexes mapped to a CORESET defined in another cell is mapped to a CORESET in which the mapped index is not present.

For example, in the above example, the UE may assume that index 0 (or index 1) is mapped to the CORESET defined in Pcell, Scell #2 and Scell #3. In other words, if there is no index mapped to the CORESET (i.e., if CORESETPoolindexcorresponding to the CORESET is not configured), the UE may assume that index 0 (e.g., CORESETPoolIndex=0) is assigned to the corresponding CORESET.

In the same manner as the above-described first example, if the UE is configured with i) a CORESET in which a specific index corresponding to the CORESET is 0 or is not configured and ii) a CORESET in which an index corresponding to the CORESET is 1, and iii) a separated HARQ-ACK codebook construction is indicated to the UE, the UE may separately generate and transmit HARQ-ACK information for the CORESET in which the specific index is 0 or the CORESET in which the specific index is not configured, and HARQ-ACK information for the CORESET in which the index corresponding to the CORESET is 1. For example, when the UE constructs a HARQ-ACK codebook, the UE may generate a codebook corresponding to index 0 for Pcell/Scell #1/Scell #2/Scell #3/Scell #4 and may generate a codebook corresponding to index 1 for Scell #1/Scell #4.

If the UE constructs a codebook corresponding to each index, the UE may construct a codebook according to the order based on a cell index (e.g., Cell ID) and a PDSCH reception occasion. The PDSCH reception occasion may mean a PDSCH monitoring occasion. For example, the UE may construct a codebook according to the order of cell index and then according to the order of PDSCH reception occasion (or the UE may construct a codebook according to the order of PDSCH reception occasion and then according to the order of cell index).

As a detailed example, in the first example, if it is assumed that two available PDSCH reception occasions (e.g., PDSCH #1 and #2) exist for each cell, and the UE constructs HARQ-ACK information as one codebook according to the order of PDSCH reception occasion after the order of cell index: a codebook corresponding to index 0 may be constructed as a codebook for HARQ-ACK information in the order of PDSCH #1 on Pcell, PDSCH #1 on Scell #1, PDSCH #1 on Scell #2, PDSCH #1 on Scell #3, PDSCH #1 on Scell #4, PDSCH #2 on Pcell, PDSCH #2 on Scell #1, PDSCH #2 on Scell #2, PDSCH #2 on Scell #3, and PDSCH #2 on Scell #4. Further, a codebook corresponding to index 1 may be constructed as a codebook for HARQ-ACK information in the order of PDSCH #1 on Scell #1, PDSCH #1 on Scell #4, PDSCH #2 on Scell #1, and PDSCH #2 on Scell #4.

<Proposal 3>

A general semi-static HARQ-ACK codebook (or Type-1 HARQ-ACK codebook) may be generated as follows. The total number of available PDSCH reception occasions (or candidates) for serving cell c is denoted by M_c, and a sum of M_c considering all the serving cells supporting a UE is denoted by M_A,c. Since the UE constructs HARQ-ACK information for all the serving cells c as one codebook and feeds back it, the UE may constructs HARQ-ACK information for the M_A,c PDSCH reception occasions as one codebook.

When the UE constructs a codebook, i) even if an actual PDSCH transmission is not performed, or ii) even if the UE fails in the PDSCH reception, or iii) even if the UE fails in the PDCCH reception scheduling the corresponding PDSCH, it is defined to transmit HARQ-ACK information for the corresponding reception occasion. Even if PDSCH transmission is not actually performed in the above-described Type-1 HARQ-ACK codebook, there is a disadvantage in that a feedback overhead increases since a bit has to be transmitted for HARQ-ACK information for all the transmittable PDSCHs.

In order to compensate the disadvantage, an operation of the following Table 10 is defined in the current 5G NR standard.

TABLE 10

TS 38.213 S9.1.2
If a UE reports HARQ-ACK information in a PUCCH only for
    a SPS PDSCH release indicated by DCI format 1_0 with counter DAI field value of 1, or
    a PDSCH reception scheduled by DCI format 1_0 with counter DAI field value of 1 on the PCell,
or
    SPS PDSCH receptions
within the $M_{A,c}$ occasions for candidate PDSCH receptions as determined in Clause 9.1.2.1, the UE determines a HARQ-ACK codebook only for the SPS PDSCH release or only for the PDSCH reception or only for the SPS PDSCH receptions according to corresponding $M_{A,c}$ occasion(s) on respective serving cell(s), where the value of counter DAI in DCI format 1_0 is according to Table 9.1.3-1 and HARQ-ACK information bits in response to SPS PDSCH receptions are ordered according to the following pseudo-code; otherwise, the procedures in Clause 9.1.2.1 and Clause 9.1.2.2 for a HARQ-ACK codebook determination apply.

As described above, in Table 10, the total number of available PDSCH reception occasions for serving cell c is denoted by M_c, and a sum of M_c considering all the serving cells supporting a UE is denoted by M_A,c.

Specifically, when the UE constructs a HARQ-ACK codebook, the UE needs to consider HARQ-ACK information for a total of M_A,c PDSCH reception occasions. However, if the UE receives DCI format 1_0 with counter DAI field value of 1 on the PCell, the UE may feedback only HARQ-ACK information for the reception of PDSCH scheduled by the DCI (i.e., DCI format 1_0 with counter DAI field value of 1 on the PCell), not feedback HARQ-ACK information for all the M_A,c PDSCH reception occasions. Hereinafter, the above-described scheme is referred to as a 'compressed semi-static HARQ-ACK codebook generation scheme' for the convenience of description. However, the use of such a term does not limit the technical scope of the present disclosure.

The compressed semi-static HARQ-ACK codebook generation scheme assumes a single TRP, and the compressed semi-static HARQ-ACK codebook generation scheme can be applied to reduce an overhead for payload when generating a semi-static HARQ-ACK codebook (or Type-1 HARQ-ACK codebook) even in a multi-TRP situation. A detailed method is described below to extend the compressed semi-static HARQ-ACK codebook generation scheme to the multi-TRP.

<Proposal 3-1>

If a separated HARQ-ACK codebook is configured/indicated to a UE, the UE may separately construct a HARQ-ACK codebook according to a specific index (e.g., CORESET group ID, HARQ codebook group ID, CORESETPoolIndex) configured (or mapped) to a CORESET. In this case, if the UE receives/detects DCI format 1_0 with counter DAI field value of 1 in the PCell, the UE may construct a codebook according to the compressed semi-static HARQ-ACK codebook generation scheme only for the HARQ-ACK codebook corresponding to a specific index configured (or mapped) to a CORESET in which the corresponding DCI is detected.

A situation of the second example may be assumed to describe a proposal 3, a proposal 3-1, a proposal 3-2, a proposal 4, a proposal 4-1, a proposal 4-2, etc. It was assumed that Pcell and Scell #1 to Scell #4 are configured, and 5 CORESETs (i.e., CORESET #0 to CORESET #4) are present for each cell. The second example describes an example where a specific index (e.g., CORESETPoolIndex) configured to the CORESET is configured to index 0 or index 1. However, the method of using a specific number of indexes (e.g., index 0/1) is merely an example for the convenience of description, and can be extendedly applied to even when methods described below configures/indicates a joint HARQ-ACK codebook/separated HARQ-ACK codebook using N or more indexes that may be configured (or mapped) to a CORESET. The second example is merely an example for the convenience of description and does not limit the technical scope of the present disclosure.

Second Example

Pcell: Index 0-CORESET #0/#1/#2/#3/#4
Scell #1: Index 0-CORESET #0/#1/#2, Index 1-CORESET #3/#4
Scell #2: Index 0-CORESET #0/#1/#2/#3/#4
Scell #3: Index 0-CORESET #0/#1/#2/#3/#4
Scell #4: Index 0-CORESET #0/#1/#2, Index 1-CORESET #3/#4

In the second example, Pcell, Scell #2 and #3 assume a single TRP transmission and represent that the same index is mapped to all the CORESETs. On the other hand, Scell #1 and Scell #4 assume a multi-TRP transmission and represent that different specific indexes (e.g., index 0 is configured to CORESET #0 to CORESET #2, and index 1 is configured to CORESET #3 and CORESET #4) are mapped to each CORESET.

In the second example, when the UE constructs the separated HARQ-ACK codebook, the UE may generate a codebook corresponding to index 0 for Pcell/Scell #1/Scell #2/Scell #3/Scell #4 and generate a codebook corresponding to index 1 for Scell #1/Scell #4. Each codebook may be transmitted via different PUCCH/PUSCH resources. If the UE receives a DCI corresponding to 'DCI format 1_0 with counter DAI field value of 1 on the PCell' in the CORESET corresponding to a specific index, the UE may apply the compressed semi-static HARQ-ACK codebook generation scheme only to the index mapped to the CORESET that succeeds in detecting the corresponding DCI. That is, the UE may generate a codebook in which only HARQ-ACK information corresponding to a PDSCH scheduled by the DCI is transmitted.

As a detailed example, if the UE receives a DCI corresponding to 'DCI format 1_0 with counter DAI field value of 1 on the PCell' in a CORESET in which CORESETPoolIndex corresponds to index 0 (or index 1), the UE may apply the compressed semi-static HARQ-ACK codebook generation scheme only when the UE generates a codebook corresponding to index 0 (or index 1). That is, the UE may generate a codebook in which only HARQ-ACK information corresponding to a PDSCH scheduled by the DCI is transmitted. For example, if the UE receives a fall back DCI in a CORESET corresponding to index 0, the UE may not transmit HARQ-ACK for a PDSCH scheduled by a DCI detected from a CORESET corresponding to index 1.

Alternatively, it may be configured to apply the compressed semi-static HARQ-ACK codebook generation scheme only if 'DCI format 1_0 with counter DAI field value of 1 on the PCell' is indicated through a CORESET corresponding to a specific index. The specific index may be defined by a fixed rule between a base station and the UE, or information on the specific index may be configured/indicated to the UE via signaling (e.g., RRC, MAC-CE, DCI, etc.).

For example, it may be assumed that index 0 is configured/indicated with the specific index. If the DCI corresponding to 'DCI format 1_0 with counter DAI field value of 1 on the PCell' is received in the CORESET corresponding to index 0, the proposed operation may be performed, and if the DCI is received in the CORESET corresponding to index 1, the proposed operation may not be performed. That is, even if the UE receives DCI that satisfies 'DCI format 1_0 with counter DAI field value of 1 on the PCell' in the CORESET corresponding to index 1, the UE may not perform the compressed semi-static HARQ-ACK codebook generation scheme described above, but the UE may generate a HARQ-ACK codebook for a PDSCH scheduled by the DCI detected in the CORESET corresponding to index 0 considering all the M_A,c PDSCH reception occasions for all the serving cells and a HARQ-ACK codebook for a PDSCH scheduled by the DCI detected in the CORESET corresponding to index 1, and transmit the codebooks via a PUCCH resource indicated by the DCI detected in each of the CORESETs.

The operation of the proposed scheme for applying the compressed semi-static HARQ-ACK codebook generation scheme described above may be determined based on DCI format 1_0 transmitted through PCell. However, from a UE perspective, whether a single TRP transmission or a multi-TRP transmission is performed may vary depending on the serving cell. Accordingly, it may be configured/indicated that the single TRP transmission is performed in PCell. In this case, a CORESET corresponding to a specific index may not be defined in PCell for different indexes configured in different CORESETs. For example, in the above-described second example, considering a relationship of PCell, SCell #1/#2/#3/#4, it may be seen that index 0 is configured to all the CORESETs defined in PCell. In this case, there may occur a problem in that DCI format 1_0 is not received through PCell for index 1.

In order to overcome the disadvantage, the following method may be considered together. If (i) PCell is configured or (ii) a CORESET configured with a specific index is not configured on PCell among the cells in which a CORESET corresponding to each index is configured for different indexes configured in different CORESETs, a UE that receives 'DCI format 1_0 with counter DAI field value of 1' through a specific SCell among the SCell(s) in which a CORESET having a specific index is configured may construct a codebook according to the compressed semi-static HARQ-ACK codebook generation scheme. For example, in the case of (ii), a specific Scell may be pre-defined by a fixed rule (e.g., Scell having lowest/highest CC ID value) between the base station and the UE, or the base station may configure a specific value to the UE via higher layer signaling (e.g., RRC, MAC-CE)/DCI.

For example, when assuming the relationship of PCell and SCell #1/#2/#3/#4 that has been described above, if the UE receives DCI format 1_0 with counter DAI field value of 1 through PCell for index 0, the UE may construct a codebook according to the compressed semi-static HARQ-ACK codebook generation scheme when constructing a HARQ-ACK codebook corresponding to index 0. In addition, if the UE receives DCI format 1_0 with counter DAI field value of 1 through SCell #1 that is lowest SCell for index 1, the UE may construct a codebook according to the compressed semi-static HARQ-ACK codebook generation scheme when constructing a HARQ-ACK codebook corresponding to index 1.

An operation method for the case in which the CORESET corresponding to the above-described specific index is not defined in PCell may be equally applied to the proposal 3-2 blow.

<Proposal 3-2>

If a joint HARQ-ACK codebook is configured/indicated to a UE, HARQ-ACK information for different TRPs may be constructed as one HARQ-ACK codebook. For example, even if different specific indexes (e.g., CORESET group ID, CORESETPoolIndex, HARQ codebook group ID) are configured to different CORESETs, HARQ-ACK information corresponding to different indexes may be constructed as one HARQ-ACK codebook.

In this case, if the UE detects DCI format 1_0 with counter DAI field value of 1 on the PCell through a specific CORESET among the CORESETs in which different indexes are configured, the UE may apply the compressed semi-static HARQ-ACK codebook generation scheme to (sub-)codebooks as many as the number of indexes corresponding to the CORESET configured to the UE itself, and may concatenate the (sub-)codebooks according to the index order to construct the joint HARQ-ACK codebook.

The proposal 3-2 is described based on the above-described second example. When the UE constructs the joint HARQ-ACK codebook, the UE may generate (sub-)codebooks corresponding to index 0 for Pcell/Scell #1/Scell #2/Scell #3/Scell #4 and generate (sub-)codebooks corresponding to index 1 for Scell #1/Scell #4. And, the UE may concatenate the two (sub-)codebooks to construct the joint HARQ-ACK codebook and then transmit it on one PUCCH/PUSCH resource.

In this case, if the UE receives the DCI corresponding to 'DCI format 1_0 with counter DAI field value of 1 on the PCell' in the CORESET corresponding to a specific index, for example, if index 0 (or index 1) is mapped to the CORESET, the UE may apply the compressed semi-static HARQ-ACK codebook generation scheme to the (sub-)codebooks corresponding to index 0 (or index 1) and apply the compressed semi-static HARQ-ACK codebook generation scheme to the (sub-)codebooks corresponding to each index for the different indexes configured in PCell among remaining different indexes and then concatenate the different (sub-)codebooks to construct one joint HARQ-ACK codebook.

The proposal may be regarded as a method of, if different multiple indexes are configured in multiple CORESETs configured to the UE, when DCI format 1_0 with counter DAI field value of 1 on the PCell is detected in the CORESET corresponding to a specific index, applying the compressed semi-static HARQ-ACK codebook generation scheme for (sub-)codebooks for all the indexes having a mapping relationship with the CORESETs defined in PCell.

On the other hand, the compressed semi-static HARQ-ACK codebook generation scheme may be applied only to a generation process of the (sub-)codebook corresponding to an index configured in the CORESET in which DCI format 1_0 with counter DAI field value of 1 on the PCell is detected. For example, if the UE receives the DCI corresponding to DCI format 1_0 with counter DAI field value of 1 on the PCell in the CORESET corresponding to index 0 (or index 1), the UE may apply the compressed semi-static HARQ-ACK codebook generation scheme only to the (sub-)codebook corresponding to index 0 (or index 1), and apply the HARQ-ACK codebook generation scheme considering all of PDSCH transmissible time points of all the serving cells, on which the CORESET configured with index 1 (or index 0) is configured, to the (sub-)codebook corresponding to the remaining different indexes (index 0 (or index 1) in the above example), and then concatenate the different (sub-)codebooks to construct one joint HARQ-ACK codebook.

Alternatively, it may be configured that the operation is applied only if it is indicated through a CORESET corresponding to a specific index. The specific index may be defined by a fixed rule between the base station and the UE, or information on the specific index may be configured/indicated to the UE via signaling, etc. For example, if the DCI corresponding to DCI format 1_0 with counter DAI field value of 1 on the PCell is received in the CORESET corresponding to index 0, the proposed operation may be performed, and if the DCI is received in the CORESET corresponding to index 1, the proposed operation may not be performed. That is, even if the UE receives DCI that satisfies DCI format 1_0 with counter DAI field value of 1 on the PCell in the CORESET corresponding to index 1, the UE may not perform the compressed semi-static HARQ-ACK codebook generation scheme described above, and the UE may generate a HARQ-ACK codebook considering all the $M_{A,c}$ PDSCH reception occasions for all the serving cells. Alternatively, the UE may expect to receive the DCI in the CORESET corresponding to index 1.

In the above proposal, the operation has been proposed based on PCell, but the operation may be extended to SCell. For example, if the UE detects DCI format 1_0 with counter DAI field value of 1 on the PCell in a certain SCell, the UE may apply the compressed semi-static HARQ-ACK codebook generation scheme for a PDSCH reception occasion corresponding to the SCell to (sub-)codebooks for all the indexes having a mapping relationship with the CORESETs defined in the corresponding SCell. If the scheme is applied, there is an advantage that the compressed semi-static HARQ-ACK codebook generation scheme can be applied to a specific cell that performs a multi-TRP operation in the case that operation of a single TRP or a multi-TRP is different for each serving cell.

For example, in the above-described second example, it has been assumed that Scell #1 and Scell #4 among Pcell/Scell #1/Scell #2/Scell #3/Scell #4 operate in a multi-TRP. In this case, if DCI format 1_0 with counter DAI field value of 1 on the PCell is received through a CORESET corresponding to index 0 or index 1 in Scell #1 (or Scell #4), the compressed semi-static HARQ-ACK codebook generation scheme can be applied to (sub-)codebooks for index 0 and index 1 having a mapping relationship with the CORESETs defined in Scell #1 (or Scell #4).

<Proposal 3-3>

In relation to the compressed semi-static HARQ-ACK codebook generation scheme described above, conditions (e.g., conditions 1 to 3) and operations (e.g., operations 1 to 3) corresponding to this may be distinguished based on the content described in TS38.213 clause 9.1.2 of the above Table 10.

Condition 1) a UE reports HARQ-ACK information in a PUCCH only for a SPS PDSCH release indicated by DCI format 1_0 with counter DAI field value of 1 on the PCell within the M_A,c occasions for candidate PDSCH receptions as in Subclause 9.1.2.1, where the value of counter DAI in DCI format 1_0 is according to Table 9.1.3-1

Condition 2) a UE reports HARQ-ACK information in a PUCCH only for a PDSCH reception scheduled by DCI format 1_0 with counter DAI field value of 1 on the PCell within the M_A,c occasions for candidate PDSCH receptions as in Subclause 9.1.2.1, where the value of counter DAI in DCI format 1_0 is according to Table 9.1.3-1

Condition 3) a UE reports HARQ-ACK information in a PUCCH only for SPS PDSCH reception within the M_A,c occasions for candidate PDSCH receptions as in Subclause 9.1.2.1, where the value of counter DAI in DCI format 1_0 is according to Table 9.1.3-1

If one condition of the three conditions described above is satisfied based on operations defined in TS38.213 clause 9.1.2 of the above Table 10, one of the following operations may be performed according to the satisfied condition.

If the condition 1 is satisfied—Operation 1) the UE determines a HARQ-ACK codebook only for the SPS PDSCH release according to corresponding M_A,c occasion(s) on respective serving cell(s).

If the condition 2 is satisfied—Operation 2) the UE determines a HARQ-ACK codebook only for the PDSCH reception according to corresponding M_A,c occasion(s) on respective serving cell(s).

If the condition 3 is satisfied—Operation 3) the UE determines a HARQ-ACK codebook only for the SPS PDSCH reception according to corresponding M_A,c occasion(s) on respective serving cell(s).

When multiple TRP transmissions based on multiple DCIs are considered for the three conditions and the three operations according to the respective conditions, the following proposed matters may be applied.

FIG. 12 illustrates an example of a summary diagram illustrating various cases (e.g., Case 1 to Case 9) for conditions related to generation of a compressed semi-static HARQ-ACK codebook and operations corresponding to the conditions. More specifically, FIG. 12 illustrates an example of proposals considering multi-DCI based multiple TRP transmissions for the operations 1 to 3 according to the conditions 1 to 3.

In FIG. 12 and the description of the proposal 3-3, a specific index configured to the CORESET may mean CORESET group ID, CORESET Pool Index or HARQ codebook group ID. "different TRPs" may mean the case in which a specific index (e.g., CORESET group ID, CORESET Pool Index, HARQ codebook group ID) configured to the CORESET is different. Unless otherwise stated, this interpretation can be equally applied to the proposals below.

In FIG. 12 and the description of the proposal 3-3, "the case where M_A,c includes all of time points corresponding to different TRPs" may mean determining whether the condition 1 or the condition 2 is satisfied for a final HARQ-ACK codebook through concatenation of respective HARQ-ACK codebooks corresponding to different TRPs, and performing the operation 1 or the operation 2 according to whether the condition is satisfied. Unless otherwise stated, this interpretation can be equally applied to the proposals below.

In FIG. 12 and the description of the proposal 3-3, "the case where M_A,c includes only a time point corresponding to a specific TRP" may mean determining whether the condition 1 or the condition 2 is satisfied for respective HARQ-ACK codebooks corresponding to different TRPs, and performing the operation 1 or the operation 2 according to whether the condition is satisfied. Unless otherwise stated, this interpretation can be equally applied to the proposals below.

Various cases (e.g., Case 1 to Case 9) for the operations 1 to 3 according to the conditions 1 to 3 are described in detail below.

Case 1) i) if the Joint HARQ-ACK codebook is configured/indicated, ii) if the condition 1 or the condition 2 is satisfied, iii) if M_A,c includes all of time points corresponding to different TRPs, and iv) if CORESET(s) configured in PCell is able to correspond/relate to all the TRPs, "if the CORESETs configured in the PCell are able to correspond to all the TRPs" may mean the case in which indexes corresponding to the CORESETs configured in the PCell can include all of indexes configured in the serving cell other than the PCell. For example, the indexes corresponding to the CORESETs configured in the PCell may be set to 0 and 1, and the indexes corresponding to the CORESETs configured in the serving cell other than the PCell may be set to at least one of 0 or 1. Unless otherwise stated, this interpretation can be equally applied to the proposals below.

If a DCI satisfying the condition 1 or the condition 2 is received in a CORESET configured with a specific index among the CORESETs configured in the PCell, the operation 1 or the operation 2 may be performed for a final HARQ-ACK codebook concatenating respective HARQ-ACK codebooks corresponding to different TRPs.

"the CORESET configured with the specific index" may mean a CORESET configured with any one specific index of multiple indexes. For example, the specific index may be defined by a fixed rule. For example, it may mean an index that is the base for selecting the CORESET is defined as a specific index (e.g., index 0 or index 1). As another example, the specific index may be configured/indicated via higher layer signaling (e.g., RRC signaling, MAC-CE, etc.)/DCI. In this case, "the CORESET configured with the specific index" may mean a CORESET corresponding to the configured specific index. Unless otherwise stated, this interpretation can be equally applied to the proposals below.

Case 2) i) if the Joint HARQ-ACK codebook is configured/indicated, ii) if the condition 1 or the condition 2 is satisfied, iii) if M_A,c includes all of time points corresponding to different TRPs, and iv) if CORESET(s) configured in PCell is able to correspond/relate only to specific TRPs, "if the CORESETs configured in the PCell are able to correspond/relate only to specific TRPs" may mean the case in which indexes corresponding to the CORESETs configured in the PCell can include only some of all the indexes configured in the serving cell other than the PCell. For example, the indexes corresponding to the CORESETs configured in the PCell may be set to 0, and the indexes corresponding to the CORESETs configured in the serving cell other than the PCell may be set to 0 and 1. Unless otherwise stated, this interpretation can be equally applied to the proposals below.

If a DCI satisfying the condition 1 or the condition 2 is received in a CORESET configured with a specific index among the CORESETs configured in the PCell, the operation 1 or the operation 2 may be performed for a final HARQ-ACK codebook concatenating respective HARQ-ACK codebooks corresponding to different TRPs.

Case 3) i) if the Joint HARQ-ACK codebook is configured/indicated, ii) if the condition 1 or the condition 2 is satisfied, iii) if M_A,c includes only a time point corresponding to a specific TRP, and iv) if CORESET(s) configured in PCell is able to correspond/relate to all the TRPs, If a DCI satisfying the condition 1 or the condition 2 is received in a CORESET configured in the PCell, the operation 1 or the operation 2 may be performed only for a HARQ-ACK codebook corresponding/relating to an index configured to the corresponding CORESET. In this case, the operation 1 or the operation 2 may be separately performed depending on whether the condition 1 or the condition 2 is satisfied for each of respective HARQ-ACK codebooks corresponding/relating to different indexes. For example, if a DCI satisfying the condition 1 or the condition 2 is received in a CORESET configured with index 0, the operation 1 or the operation 2 may be performed only for a HARQ-ACK codebook corresponding/relating to the index 0. Independent from this, if a DCI satisfying the condition 1 or the condition 2 is received in a CORESET configured with index 1, the operation 1 or the operation 2 may be performed only for a HARQ-ACK codebook corresponding/relating to the index 1.

Case 4) i) if the Joint HARQ-ACK codebook is configured/indicated, ii) if the condition 1 or the condition 2 is satisfied, iii) if M_A,c includes only a time point corresponding to a specific TRP, and iv) if CORESET(s) configured in PCell is able to correspond/relate only to specific TRPs, If a DCI satisfying the condition 1 or the condition 2 is received in a CORESET configured in the PCell, the operation 1 or the operation 2 may be performed only for a HARQ-ACK codebook corresponding/relating to an index configured to the corresponding CORESET. In this case, the operation 1 or the operation 2 may be separately performed depending on whether the condition 1 or the condition 2 is satisfied for each of respective HARQ-ACK codebooks corresponding/relating to different indexes. For example, if a DCI satisfying the condition 1 or the condition 2 is received in a CORESET configured with index 0, the operation 1 or the operation 2 may be performed only for a HARQ-ACK codebook corresponding/relating to the index 0. Independent from this, if a DCI satisfying the condition 1 or the condition 2 is received in a CORESET configured with index 1, the operation 1 or the operation 2 may be performed only for a HARQ-ACK codebook corresponding/relating to the index 1.

In the case of TRP at which CORESET is not configured in PCell in the above case (e.g., case 4) (if CORESET associated with an index (e.g., CORESETPoolIndex) corresponding to the TRP is not included in CORESET configured in PCell), that is, in the case of index not corresponding to CORESET(s) configured in PCell, the condition 1 or the condition 2 cannot be satisfied for a HARQ-ACK codebook corresponding to the corresponding index, and thus the operation 1 or the operation 2 cannot be performed. For example, if only 0 is included in an index corresponding to CORESET(s) configured in PCell and 1 is not included in the index, the condition 1 or the condition 2 cannot be satisfied for a HARQ-ACK codebook corresponding to index 1, and thus the operation 1 or the operation 2 cannot be performed. Even in the case of TRP at which CORESET is not configured in PCell, that is, even in the case of index not corresponding to CORESETs configured in PCell (e.g., corresponding to index 1 in the above case), the following proposal may be applied in order to transmit a codebook of a small payload for a HARQ-ACK codebook corresponding to the corresponding index.

Case 4-1) In addition to the Case 4, in the case of TRP to which CORESET(s) not configured in PCell corresponds/relates In the condition 1 or the condition 2, PCell may be replaced by a specific SCell among SCells configured for the UE. For example, among the SCells configured for the UE, SCell having the lowest/largest ID may be applied. According to the proposal, replacing the PCell by the specific SCell may be restricted to a special case. The special case may be the case in which a CORESET configured with an index not corresponding/relating to the corresponding CORESETs exists for CORESETs configured in PCell (e.g., the case in which a TRP at which a CORESET/CORESET group is configured exists only for SCell). When applying the proposal, the condition 1 and the condition 2 may be modified as in the following Table 11.

TABLE 11

Condition 1-modified) a UE reports HARQ-ACK information in a PUCCH only for a SPS PDSCH release indicated by DCI format 1_0 with counter DAI field value of 1 on the SCell with lowest id within the M_A,c occasions for candidate PDSCH receptions as in Subclause 9.1.2.1, where the value of counter DAI in DCI format 1_0 is according to Table 9.1.3-1
Condition 2-modified) a UE reports HARQ-ACK information in a PUCCH only for a PDSCH reception scheduled by DCI format 1_0 with counter DAI field value of 1 on the SCell with lowest id within the M_A,c occasions for candidate PDSCH receptions as in Subclause 9.1.2.1, where the value of counter DAI in DCI format 1_0 is according to Table 9.1.3-1

Alternatively, if condition 1 or condition 2 is satisfied for respective HARQ-ACK codebooks corresponding to different indexes, a rule may be defined so that the CORESETs configured in PCell correspond to all the TRPs to perform the operation 1 or the operation 2. That is, the base station may configure CORESETs to the UE so that indexes corresponding to CORESETs configured in PCell include all indexes configured in a serving cell other than PCell. Case 5) i) if the Joint HARQ-ACK codebook is configured/indicated, ii) if the condition 3 is satisfied, and iii) if M_A,c includes all of time points corresponding to different TRPs, the UE may determine whether the condition 3 is satisfied for a final HARQ-ACK codebook concatenating respective HARQ-ACK codebooks corresponding to different TRPs, and may perform the operation 3 depending on whether the condition is satisfied.

Case 6) i) if the Joint HARQ-ACK codebook is configured/indicated, ii) if the condition 3 is satisfied, and iii) if M_A,c includes only a time point corresponding to a specific TRP, the UE may determine whether the condition 3 is satisfied for respective HARQ-ACK codebooks corresponding to different TRPs, and may perform the operation 3 for the respective HARQ-ACK codebooks depending on whether the condition is satisfied. In this case, the UE may perform separately the operation 3 depending on whether the condition 3 is satisfied for each of the respective HARQ-ACK codebooks corresponding to different TRPs.

Case 7) i) if the Separated HARQ-ACK codebook is configured/indicated, ii) if the condition 1 or the condition 2 is satisfied, iii) if M_A,c includes only a time point corresponding to a specific TRP, and iv) if CORESETs configured in PCell are able to correspond/relate to all the TRPs, if a DCI satisfying the condition 1 or the condition 2 is received in a CORESET configured with a specific index among the CORESETs configured in the PCell, the operation 1 or the operation 2 is performed only for the HARQ-ACK codebook corresponding to the specific index. In this case, the operation 1 or the operation 2 may be separately performed depending on whether the condition 1 or the condition 2 is satisfied for each of respective HARQ-ACK codebooks corresponding to different indexes.

"if the CORESETs configured in the PCell are able to correspond to all the TRPs" may mean the case in which indexes corresponding to the CORESETs configured in the PCell can include all of indexes configured in the serving cell other than the PCell. Unless otherwise stated, this interpretation can be equally applied to the proposals below.

Case 8) i) if the Separated HARQ-ACK codebook is configured/indicated, ii) if the condition 1 or the condition 2 is satisfied, iii) if M_A,c includes only a time point corresponding to a specific TRP, and iv) if CORESETs configured in PCell are able to correspond/relate only to specific TRPs, "if the CORESETs configured in the PCell are able to correspond/relate only to specific TRPs" may mean the case in which indexes corresponding to the CORESETs configured in the PCell can include only some of all the indexes configured in the serving cell other than the PCell. Unless otherwise stated, this interpretation can be equally applied to the proposals below.

If a DCI satisfying the condition 1 or the condition 2 is received in a CORESET configured in the PCell, the operation 1 or the operation 2 may be performed only for a HARQ-ACK codebook corresponding to an index configured to the corresponding CORESET. In this case, the operation 1 or the operation 2 may be separately performed depending on whether the condition 1 or the condition 2 is satisfied for each of respective HARQ-ACK codebooks corresponding to different indexes. For example, if a DCI satisfying the condition 1 or the condition 2 is received in a CORESET configured with index 0, the operation 1 or the operation 2 may be performed only for a HARQ-ACK codebook corresponding/relating to the index 0. Independent from this, if a DCI satisfying the condition 1 or the condition 2 is received in a CORESET configured with index 1, the operation 1 or the operation 2 may be performed only for a HARQ-ACK codebook corresponding/relating to the index 1.

In the case of TRP at which CORESET is not configured in PCell in the above case (e.g., case 8), that is, in the case of index not corresponding to the corresponding CORESETs for CORESETs configured in PCell, the condition 1 or the condition 2 cannot be satisfied for a HARQ-ACK codebook corresponding to the corresponding index, and thus the operation 1 or the operation 2 cannot be performed. For example, if only 0 is included in an index corresponding to CORESET(s) configured in PCell and 1 is not included in the index, the condition 1 or the condition 2 cannot be satisfied for a HARQ-ACK codebook corresponding to index 1, and thus the operation 1 or the operation 2 cannot be performed. Even in the case of TRP at which CORESET is not configured in PCell, that is, even in the case of index not corresponding/relating to the corresponding CORESETs for CORESETs configured in PCell (e.g., corresponding to index 1 in the above case), the following proposal may be applied in order to transmit a codebook of a small payload for a HARQ-ACK codebook corresponding to the corresponding index.

Case 8-1) In addition to the Case 8, in the case of TRP to which CORESET(s) not configured in Pcell corresponds/relates In the condition 1 or the condition 2, PCell may be replaced by a specific SCell among SCells configured for the UE. For example, among the SCells configured for the UE, SCell having the lowest/largest ID may be applied. According to the proposal, replacing the PCell by the specific SCell may be restricted to a special case. The special case may be the case in which a CORESET configured with an index not corresponding/relating to the corresponding CORESETs exists for CORESETs configured in PCell (e.g., the case in which a TRP at which a CORESET/CORESET group is configured exists only for SCell). When applying the proposal, the condition 1 and the condition 2 may be modified as in the following Table 12.

TABLE 12

Condition1-Modified) a UE reports HARQ-ACK information in a PUCCH only for a SPS PDSCH release indicated by DCI format 1_0 with counter DAI field value of 1 on the SCell with lowest id within the M_A,c occasions for candidate PDSCH receptions as in Subclause 9.1.2.1, where the value of counter DAI in DCI format 1_0 is according to Table 9.1.3-1
Condition2-Modified) a UE reports HARQ-ACK information in a PUCCH only for a PDSCH reception scheduled by DCI format 1_0 with counter DAI field value of 1 on the SCell with lowest id within the M_A,c occasions for candidate PDSCH receptions as in Subclause 9.1.2.1, where the value of counter DAI in DCI format 1_0 is according to Table 9.1.3-1

Alternatively, if condition 1 or condition 2 is satisfied for respective HARQ-ACK codebooks corresponding to different indexes, a rule may be defined so that the CORESETs configured in PCell correspond to all the TRPs to perform the operation 1 or the operation 2. That is, the base station may configure CORESETs to the UE so that indexes corresponding to CORESETs configured in PCell include all indexes configured in a serving cell other than PCell. Case 9) i) if the Separated HARQ-ACK codebook is configured/indicated, ii) if the condition 3 is satisfied, and iii) if M_A,c includes only a time point corresponding to a specific TRP, The UE may determine whether the condition 3 is satisfied for respective HARQ-ACK codebooks corresponding to different TRPs, and may perform the operation 3 for the respective HARQ-ACK codebooks depending on whether the condition is satisfied. In this case, the operation 3 may be separately performed for each of the respective HARQ-ACK codebooks corresponding to different TRPs depending on whether the condition 3 is satisfied.

<Proposal 4>

For a Type-1 HARQ-ACK codebook, in order to indicate whether HARQ-ACK information is multiplexed with a PUSCH transmission, the following operation described in Table 13 is defined in the current 5G NR standard.

TABLE 13

TS 38.213 S9.1.2.2
(for semi-static) If a UE multiplexes HARQ-ACK information in a PUSCH transmission that is scheduled by DCI format 0_1, the UE generates the HARQ-ACK codebook as described in Clause 9.1.2.1 when a value of the DAI field in DCI format 0_1 is $V_{T-DAI}^{UL} = 1$ except that harq-ACK-SpatialBundlingPUCCH is replaced by harq-ACK-SpatialBundlingPUSCH. The UE does not generate a HARQ-ACK codebook for multiplexing in the PUSCH transmission when $V_{T-DAI}^{UL} = 0$ unless the UE receives only a SPS PDSCH release, or only a SPS PDSCH, or only a PDSCH that is scheduled by DCI format 10 with a counter DAI field value of 1 on the PCell in the $M_c$ occasions for candidate PDSCH receptions in which case the UE generates HARQ-ACK information only for the SPS PDSCH release or only for the PDSCH reception as described in Clause 9.1.2. $V_{T-DAI}^{UL} = 0$ if the DAI field in DCI format 0_1 is set to '0'; otherwise, $V_{T-DAI}^{UL} = 1$.

In the following description, $V_{T-DAI}^{UL}$ in Table 13 is denoted by V^UL_TDAI. The above operation is described as below. The operation is described below. A base station may indicate, to a UE, whether to transmit a HARQ-ACK codebook on a PUSCH. To this end, the base station may use V^UL_TDAI field (e.g., 1st DAI field) value configured/indicated to DCI format 0_1 that schedules the PUSCH, and if the value is indicated as 1, the UE may transmit the HARQ-ACK codebook via the PUSCH. On the other hand, if V^UL_TDAI field value is indicated as 0, the UE may transmit the HARQ-ACK codebook on the corresponding PUSCH only when the compressed semi-static HARQ-ACK codebook generation scheme is indicated. The operation may be referred to as a 'method for transmitting a HARQ-ACK codebook to PUSCH' for the convenience of describing the following proposal technologies. However, the use of such a term does not limit the technical scope of the present disclosure. The method for transmitting the HARQ-ACK codebook to PUSCH assumes a single TRP, and a new operation needs to be defined to support the operation even in a multi-TRP situation. In the following description, an operation is proposed to extend the operation to the multi-TRP.

<Proposal 4-1>

If the separated HARQ-ACK codebook is configured/indicated to a UE, the UE may construct independently a HARQ-ACK codebook according to a specific index (e.g., CORESET group ID, CORESETPoolIndex, HARQ codebook group ID) configured to a CORESET. In this case, it may be defined such that a method for transmitting, to the PUSCH, a HARQ-ACK codebook informing whether HARQ-ACK information is multiplexed with a PUSCH transmission operates between CORESETs configured with the same index.

The proposal 4-1 is described based on the above-described second example. In the second example, PCell and SCells #2 and #3 assume a single TRP transmission and illustrate an example where the same index (e.g., index 0) is mapped to all the CORESETs. On the other hand, SCell #1 and SCell #4 assume a multi-TRP transmission and illustrate an example where a different specific index is mapped to each CORESET (e.g., index 0 is configured to CORESET #0 to CORESET #2, and index 1 is configured to CORESET #3 and CORESET #4).

In the second example, when the UE constructs the separated HARQ-ACK codebook, the UE may generate a codebook corresponding to index 0 for Pcell/Scell #1/Scell #2/Scell #3/Scell #4 and may generate a codebook corresponding to index 1 for Scell #1/Scell #4. Each codebook may be transmitted on a different PUCCH/PUSCH resource.

In this instance, V^UL_TDAI value defined in DCI format 0_1 which is referenced in the method for transmitting the HARQ-ACK codebook to PUSCH may be applied only to a codebook that corresponds to an index mapped to a CORESET in which the corresponding DCI is detected. For example, the UE may detect the DCI format 0_1 in a CORESET to which index 0 (or index 1) is configured, may generate a HARQ-ACK codebook corresponding to index 0 (or index 1) if the V^UL_TDAI value is 1, and may then multiplex the HARQ-ACK codebook with the PUSCH according to the method for transmitting a HARQ-ACK codebook to a PUSCH. The HARQ-ACK codebook corresponding to index 1 (or index 0) may be transmitted together to a PUSCH according to the V^UL_TDAI value indicated in the DCI format 0_1 transmitted through a CORESET to which index 1 (or index 0) is configured, or may be transmitted on a PUCCH resource indicated by DCI when there is no PUSCH resource overlapped with a PUCCH resource.

<Proposal 4-2>

If the joint HARQ-ACK codebook is configured/indicated to a UE, HARQ-ACK information corresponding to a different index may be constructed as one HARQ-ACK codebook even if a different specific index (e.g., CORESET group ID, CORESETPoolIndex, HARQ codebook group ID) is configured to a different CORESET. In this instance, in order to perform a method for transmitting, to a PUSCH, a HARQ-ACK codebook informing whether HARQ-ACK information is multiplexed with a PUSCH transmission, a DCI field (e.g., 1st DAI field in DCI format 01) for indicating this may be extended to as many as the number of different indexes mapped to CORESET configured to the UE.

The proposal 4-2 is described based on the above-described second example. In the second example, PCell, SCell #2, and SCell #3 assume a single TRP transmission and illustrate an example where the same index (e.g., index 0) is mapped to all the CORESETs. On the other hand, SCell #1 and SCell #4 assume a multi-TRP transmission and illustrate an example where a different specific index is mapped to each CORESET (e.g., index 0 is configured to CORESET #0 to CORESET #2, and index 1 is configured to CORESET #3 and CORESET #4).

In the second example, when the UE constructs the joint HARQ-ACK codebook, the UE may generate (sub-)codebooks corresponding to index 0 for Pcell/Scell #1/Scell #2/Scell #3/Scell #4 and generate (sub-)codebooks corresponding to index 1 for Scell #1/Scell #4. Further, the UE may concatenate the two (sub-)codebooks to construct the joint HARQ-ACK codebook and then transmit it on one PUCCH/PUSCH resource.

For example, if index 0 and index 1 are configured to a CORESET, the corresponding DCI field in DCI format 0_1 may be extended to 2 bits (or as many as the number of indexes configured to the CORESET), in order to indicate whether a (sub-)codebook corresponding to each index in the joint HARQ-ACK codebook is multiplexed with the PUSCH and transmitted. For example, whether to multiplex a (sub-)codebook corresponding to index 0 may be indicated using 1 bit, and whether to multiplex a (sub-)codebook corresponding to index 1 may be indicated using other 1 bit. In this case, the (sub-)codebook for which multiplexing is not indicated may not be transmitted (dropped) to the base station.

The UE may indicate whether or not the entire joint HARQ-ACK codebook is multiplexed with the PUSCH while using the existing defined DCI field as it is together with the above method. For example, if V^UL_TDAI value of DCI format 0_1 is 1, the entire joint HARQ-ACK codebook may be multiplexed with the PUSCH. In the opposite case (i.e., if V^UL_TDAI value is 0), the entire joint HARQ-ACK codebook may not be multiplexed with the PUSCH.

The above-described examples have mainly described the method of using or extending a DCI field defined in the existing DCI format. However, in order to perform the above proposal, it is possible to define a new DCI field in a DCI format or perform the proposed operation when combinations of specific values are indicated for the existing DCI fields (e.g., DMRS port indication field, TB information field, etc.).

The 'index' in 'index configured to the CORESET', 'CORESET corresponding to a specific index', etc. described in the proposals 1 to 4 of the present disclosure may mean an index that can be interpreted as a sort of index, for example, CORESET group ID, CORESETPoolIndex, HARQ codebook group ID, etc. which may be included in a CORESET configuration separately from an index (e.g., CORESET ID) configured to distinguish the CORESETs.

When constructing the joint ACK/NACK codebook described in the proposals 1 to 4 of the present disclosure, a method of constructing (sub-)codebooks corresponding to different indexes and then concatenating the (sub-)codebooks corresponding to the different indexes according to the index order has been described by way of example. The example may be merely an example of constructing the joint ACK/NACK codebook and is not limited to a sole method of constructing the joint ACK/NACK codebook. Other methods can also be applied for constructing the joint ACK/NACK codebook, and may consequently have a feature in that HARQ-ACK information for PUSCHs scheduled by the DCI transmitted through CORESETs corresponding to different indexes in the HARQ-ACK codebook that the UE transmits to the base station may be configured and transmitted together.

FIG. 13 illustrates signaling when a UE receives multiple DCIs (i.e., when each TRP transmits a DCI to the UE) in a situation of M-TRP (or M-cell, all the TRPs may be hereinafter replaced by cells, or assumed as M-TRP even when a plurality of CORESETs (/CORESET groups) is configured from one TRP). FIG. 13 illustrates merely an example for convenience of explanation and does not limit the technical scope of the present disclosure.

Although the following description will be given with respect to "TRP", "TRP" may be replaced with other expressions such as a panel, an antenna array, a cell (e.g., macro cell/small cell/pico cell), a TP (transmission point), and a base station (gNB). Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed via higher layer signaling (e.g., RRC signaling).

Referring to FIG. 13, signaling between two TRPs and the UE is considered for the convenience of explanation, but this signaling method can be extendedly applied to signaling between multiple TRPs and multiple UEs. In the description below, a network side may be a base station including a plurality of TRPs or a cell including a plurality of TRPs. For example, ideal/non-ideal backhaul may be configured between TRP 1 and TRP 2 constituting the network side. Further, the description below is described based on multiple TRPs, but this can be extendedly applied to transmission through multiple panels. In addition, in the present disclosure, an operation for a UE to receive a signal from TRP1/TRP2 may be interpreted/described as (or may be) an operation for the UE to receive a signal from the network side (through/using TRP1/TRP2), and an operation for the UE to transmit a signal to TRP1/TRP2 may be interpreted/described as (or may be) an operation for the UE to transmit a signal to the network side (through/using TRP1/TRP2), and they may be interpreted/described in an inversed manner.

The UE may receive configuration information related to multiple TRP-based transmission and reception through/using TRP 1 (and/or TRP 2) from a network side (S1305). That is, the network side may transmit configuration information related to multiple TRP transmission and reception to the UE through/using TRP 1 (and/or TRP 2) (S1305). The configuration information may include information related to the configuration of the network side (i.e., TRP configuration), resource information related to multiple TRP-based transmission and reception (resource allocation), and so on. The configuration information may be delivered through higher-layer signaling (e.g., RRC signaling, MAC-CE, etc.). Also, if the configuration information is predefined or preset, the corresponding step may be omitted.

For example, the configuration information may include CORESET related configuration information (e.g., ControlResourceSet IE) as described in the above-described methods (e.g., proposal 1/proposal 2/proposal 3/proposal 4, etc.). The CORESET related configuration information may include a CORESET related ID (e.g., controlResourceSetID), an index of a CORESET pool for CORESET (e.g., CORESETPoolIndex), time/frequency resource configuration of CORESET, TCI information related to CORESET, and the like. The index of the CORESET pool (e.g., CORESETPoolIndex) may mean a specific index (e.g., CORESET group Index, HARQ Codebook index) mapped/configured to each CORESET.

For example, if an index of a CORESET pool (e.g., CORESETPoolIndex) corresponding to a specific CORESET is not indicated/configured, the UE may assume that index 0 (e.g., CORESETPoolIndex=0) is assigned to the corresponding CORESET.

For example, the configuration information may include configuration, etc. related to the joint HARQ-ACK codebook or the separated HARQ-ACK codebook, etc. described in the above-described methods (e.g., proposal 1/proposal 2/proposal 3/proposal 4, etc.). For example, the configuration information may a parameter (e.g., ackNackFeedbackMode) for configuring a HARQ-ACK codebook scheme, and the joint HARQ-ACK codebook or the separated HARQ-ACK codebook may be indicated through the parameter. For example, the configuration information may include information related to the compressed semi-static HARQ-ACK codebook generation/HARQ-ACK information and information indicating whether or not PUSCH is multiplexed, and the like, as described in the above-described methods (e.g., proposal 1/proposal 2/proposal 3/proposal 4, etc.).

For example, the configuration information may include configuration, etc. related to PDCCH/PDSCH/PUCCH/PUSCH, etc., as described in the above-described methods (e.g., proposal 1/proposal 2/proposal 3/proposal 4, etc.).

For example, in the above step S1305, an operation in which the UE (100/200 of FIGS. 16 to 20) receives configuration information related to the multiple TRP-based transmission and reception from the network side (100/200 of FIGS. 16 to 20) may be implemented by an apparatus of FIGS. 16 to 20 to be described below. For example, referring to FIG. 17, one or more processors 102 may control one or more transceivers 106 and/or one or more memories 104 to receive the configuration information related to the multiple TRP-based transmission and reception, and one or more transceivers 106 may receive the configuration information related to the multiple TRP-based transmission and reception from the network side.

Similarly, in the above step S1305, an operation in which the network side (100/200 of FIGS. 16 to 20) transmits configuration information related to the multiple TRP-based transmission and reception to the UE (100/200 of FIGS. 16 to 20) may be implemented by an apparatus of FIGS. 16 to 20 to be described below. For example, referring to FIG. 17, one or more processors 102 may control one or more transceivers 106 and/or one or more memories 104 to transmit the configuration information related to the multiple TRP-based transmission and reception, and the configuration information related to the multiple TRP-based transmission and reception is transmitted, by one or more transceivers 106, from the network side.

The UE may receive DCI 1 and Data 1 scheduled by the DCI 1 through/using TRP 1 from the network side (S1310-1). The UE may also receive DCI 2 and Data 2 scheduled by the DCI 2 through/using TRP 2 from the network side (S1310-2). That is, the network side may transmit DCI 1 and Data 1 scheduled by the DCI 1 to the UE through/using TRP 1 (S1310-1). The network side may also transmit DCI 2 and Data 2 scheduled by the DCI 2 to the UE through/using TRP 2 (S1310-2). For example, DCI (e.g., DCI 1, DCI 2) and Data (e.g., Data 1, Data 2) may be transmitted via a control channel (e.g., PDCCH, etc.) and a data channel (e.g., PDSCH, etc.). Further, the steps S1310-1 and S1310-2 may be performed simultaneously, or one of the steps S1310-1 and S1310-2 may be performed earlier than the other.

For example, as described in the above-described methods (e.g., proposal 1/proposal 2/proposal 3/proposal 4, etc.), the DCI 1 and/or the DCI 2 may be transmitted and received via a PDCCH and may include scheduling information for a PDSCH for transmitting and receiving the Data 1 and/or the Data 2. For example, the DCI 1 and/or the DCI 2 may be detected/received from a CORESET to which a specific index (e.g., CORESETPoolIndex) is mapped/configured, as described in the above-described methods (e.g., proposal 1/proposal 2/proposal 3/proposal 4, etc.).

For example, the DCI 1 and/or the DCI 2 may include information for at least one operation of the above-described methods (e.g., proposal 1/proposal 2/proposal 3/proposal 4, etc.). As an example, as described in the above-described methods (e.g., proposal 1/proposal 2/proposal 3/proposal 4, etc.), the DCI 1 and/or the DCI 2 may be used to indicate the joint HARQ-ACK codebook or the separated HARQ-ACK codebook. More specifically, the DCI 1 and/or the DCI 2 may include an explicit field indicating one of the joint HARQ-ACK codebook or the separated HARQ-ACK codebook. Alternatively, one of the joint HARQ-ACK codebook or the separated HARQ-ACK codebook may be indicated (explicitly/implicitly) based on specific field information (e.g., PUCCH resource indicator (PRI)) included in the DCI 1 and/or the DCI 2. For example, the DCI 1 and/or the DCI 2 may be 'DCI format 1_0 with counter DAI field value of 1 on the PCell' described above.

For example, an operation for the UE (100/200 of FIGS. 16 to 20) of the steps S1310-1/S1310-2 to receive the DCI 1 and/or the DCI 2 and/or the Data 1 and/or the Data 2 from the network side (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to receive the DCI 1 and/or the DCI 2 and/or the Data 1 and/or the Data 2, and the one or more transceivers 106 may receive the DCI 1 and/or the DCI 2 and/or the Data 1 and/or the Data 2 from the network side.

Similar to this, an operation for the network side (100/200 of FIGS. 16 to 20) of the steps S1310-1/S1310-2 to transmit the DCI 1 and/or the DCI 2 and/or the Data 1 and/or the Data 2 to the UE (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to transmit the DCI 1 and/or the DCI 2 and/or the Data 1 and/or the Data 2, and the one or more transceivers 106 may transmit the DCI 1 and/or the DCI 2 and/or the Data 1 and/or the Data 2 to the UE.

The UE may decode the Data 1 and/or the Data 2 receiving from TRP 1 and TRP 2 (S1315). For example, the UE may perform decoding on channel estimation and/or data based on the above-described methods (e.g., proposal 1/proposal 2/proposal 3/proposal 4, etc.), etc.

For example, an operation for the UE (100/200 of FIGS. 16 to 20) of the step S1315 to decode the Data 1 and the Data 2 may be implemented by the device of FIGS. 16 to 20 to be described below. For example, referring to FIG. 17, one or more processors 102 may control one or more memories 104 so as to decode the Data 1 and the Data 2.

Although not illustrated in FIG. 13, as described in the above-described method (e.g., proposal 4), the UE may receive, from the network side, DCI 3 for scheduling the PUSCH independently form the DCI 1 and the DCI 2. For example, the DCI 3 may be DCI format 0_1 and may include 1-bit or n-bit (n>1) DAI field.

Based on the above-described proposal methods (e.g., proposal 1/proposal 2/proposal 3/proposal 4, etc.), the UE may transmit HARQ-ACK information (e.g., ACK information, NACK information, etc.) for the DCI and/or the Data 1 and/or the Data 2 on one or more PUCCHs to the network side through/using TRP 1 and/or TRP 2 (S1320-1, S1320-2). That is, based on the above-described proposal methods (e.g., proposal 1/proposal 2/proposal 3/proposal 4, etc.), the network side may receive HARQ-ACK information (e.g., ACK information, NACK information, etc.) for the DCI and/or the Data 1 and/or the Data 2 from the UE through/using TRP 1 and/or TRP 2 (S1320-1, S1320-2).

For example, HARQ-ACK information for the Data 1 and/or the Data 2 may be combined into one or separated. The UE may be configured to transmit only HARQ-ACK information as a representative TRP (e.g., TRP 1), and transmission of HARQ-ACK information to another TRP (e.g., TRP 2) may be omitted.

For example, the HARQ-ACK information may be constructed as the joint HARQ-ACK codebook or the separated HARQ-ACK codebook described in the above-described methods (e.g., proposal 1/proposal 2/proposal 3/proposal 4, etc.).

For example, based on that information related to a feedback mode of the configuration information indicates a joint mode, first HARQ-ACK information associated with the TRP1 and second HARQ-ACK information associated with the TRP2 may be concatenated to construct one HARQ-ACK information. The one HARQ-ACK information constructed by concatenating the first HARQ-ACK information and the second HARQ-ACK information may be transmitted to a specific TRP on the same uplink resource (e.g., PUCCH, PUSCH, etc.).

For example, based on that information related to the feedback mode indicates a separate mode, first HARQ-ACK information associated with the TRP1 and second HARQ-ACK information associated with the TRP2 may be separately TDMed (Time division Multiplexing) in one slot and transmitted. Alternatively, each HARQ-ACK information may be transmitted to each TRP on a different uplink resource (e.g., PUCCH, PUSCH, etc.).

For example, the HARQ-ACK information may be transmitted via PUCCH and/or PUSCH. For example, a PUCCH resource on which the HARQ-ACK information is transmitted may be determined based on the above-described methods (e.g., proposal 1/proposal 2/proposal 3/proposal 4, etc.).

For example, if the joint HARQ-ACK codebook is constructed, a PUCCH resource may be determined depending on a PUCCH resource indicator (PRI) field value indicated through a specific DCI. If the UE receives different DCIs (e.g., first DCI and second DCI) from CORESETs corresponding to different CORESETPoolIndex, the order of DCI may be determined based on i) a time point at which the DCI is transmitted, ii) CORESETPoolIndex configured to the CORESET to which the DCI is transmitted, and iii) a cell index (or ID). The time point at which the DCI is transmitted may mean an index of a monitoring occasion related to a channel (e.g., PDCCH) on which the DCI is transmitted. The PUCCH resource may be determined depending on a PRI field value of a specific DCI (e.g., last DCI) determined based on the order of DCI.

For example, the HARQ-ACK information may be configured as a compressed semi-static HARQ-ACK codebook considering the DCI (e.g., DCI 1/DCI 2)/all the serving cells supporting the UE/the number of available PDSCH reception occasions for the serving cell.

For example, an operation for the UE (100/200 of FIGS. 16 to 20) of the steps S1320-1/S1320-2 to transmit HARQ-ACK information for the Data 1 and/or the Data 2 to the network side (100/200 of FIGS. 16 to 20) on one or more PUCCHs may be implemented by the device of FIGS. 16 to 20 to be described below. For example, referring to FIG. 17, one or more processors 102 may control one or more transceivers 106 and/or one or more memories 104 so as to transmit HARQ-ACK information for the Data 1 and/or the Data 2 on one or more PUCCHs, and the one or more transceivers 106 may transmit the HARQ-ACK information for the Data 1 and/or the Data 2 to the network side.

Similar to this, an operation for the network side (100/200 of FIGS. 16 to 20) of the steps S1320-1/S1320-2 to receive HARQ-ACK information for the Data 1 and/or the Data 2 from the UE (100/200 of FIGS. 16 to 20) on one or more PUCCHs may be implemented by the device of FIGS. 16 to 20 to be described below. For example, referring to FIG. 17, one or more processors 102 may control one or more transceivers 106 and/or one or more memories 104 so as to receive HARQ-ACK information for the Data 1 and/or the Data 2, and the one or more transceivers 106 may receive the HARQ-ACK information for the Data 1 and/or the Data 2 from the UE.

FIG. 13 illustrates mainly the multi-DCI based M-TRP operation, but can be applied to a single DCI based M-TRP operation, if necessary or desired.

FIG. 14 illustrates an example of a flow chart of a hybrid automatic repeat and reQuest-acknowledgement (HARQ-ACK) information transmission operation of a user equipment (UE) to which the methods (e.g., proposal 1/proposal 2/proposal 3/proposal 4, etc.) described in the present disclosure are applicable. The UE may be supported by a plurality of TRPs, and ideal/non-ideal backhaul may be configured between the plurality of TRPs. FIG. 14 is merely for convenience of explanation and does not limit the scope of the present disclosure. Some step(s) illustrated in FIG. 14 may be omitted according to situation and/or configuration.

The following description is given based on "TRP", but as described above, the "TRP" may be applied by being replaced by an expression, such as a panel, an antenna array, a cell (e.g., macro cell/small cell/pico cell, etc.), a transmission point (TP), and a base station (e.g., gNB, etc.). Further, as described above, the TRPs may be distinguished according to information (e.g., index, ID) on CORESET group (or CORESET pool). For example, if one UE is configured to perform transmission and reception with multiple TRPs (or cells), this may mean that multiple CORESET groups (or CORESET pools) are configured to one UE. Such a configuration for the CORESET group (or CORESET pool) may be performed via higher layer signaling (e.g., RRC signaling).

Although not shown in FIG. 14, the UE may receive configuration information. The configuration information may be received via higher layer signaling (e.g., RRC or MAC CE, etc.). An operation of receiving the configuration information may be performed before the operation of receiving the first DCI and the second DCI in the step S1410.

For example, the configuration information may include CORESET related configuration information (e.g., ControlResourceSet IE) as described in the above-described methods (e.g., proposal 1/proposal 2/proposal 3/proposal 4, etc.). The CORESET related configuration information may include a CORESET related ID (e.g., controlResourceSetID), an index of CORESET pool for CORESET (e.g., CORESETPoolIndex), time/frequency resource configuration of CORESET, TCI information related to CORESET, and the like.

For example, if an index of a CORESET pool (e.g., CORESETPoolIndex) corresponding to a specific CORESET is not indicated/configured, the UE may assume that index 0 (e.g., CORESETPoolIndex=0) is assigned to the corresponding CORESET.

For example, the configuration information may include information (e.g., ackNackFeedbackMode) related to a feedback mode of the HARQ-ACK information. The information related to the feedback mode may indicate one of a joint mode or a separate mode, and a HARQ-ACK codebook may be constructed based on the indicated mode. For example, as described in the above-described methods (e.g., proposal 1/proposal 2/proposal 3/proposal 4, etc.), a joint HARQ-ACK codebook may be constructed if the joint mode is indicated, and a separated HARQ-ACK codebook may be constructed if the separate mode is indicated.

For example, as described in the above-described methods (e.g., proposal 1/proposal 2/proposal 3/proposal 4, etc.), the configuration information may include information related to a compressed semi-static HARQ-ACK codebook generation/HARQ-ACK information and information indicating whether or not PUSCH is multiplexed, and the like.

The UE may receive first downlink control information (DCI) based on a first control resource set group and second DCI based on a second control resource set group, in S1410. As described in the above-described methods (e.g., proposal 1/proposal 2/proposal 3/proposal 4, etc.), a control resource set group may include one or more control resource sets (i.e., CORESETs) corresponding to the same CORESETPoolIndex, and may be a concept corresponding to a CORESET pool. Thus, receiving each DCI based on a different control resource set group may mean receiving each DCI via CORESET corresponding to a different CORESETPoolIndex. That is, CORESETPoolIndex corresponding to CORESET to which each DCI is received may be differently configured.

The first DCI and the second DCI may be transmitted via a downlink control channel (e.g., PDCCH). Each DCI may include a DMRS port related field, a transport block related field, a PUCCH resource indicator (PRI) field, and the like. For example, as described in the above-described methods (e.g., proposal 1/proposal 2/proposal 3/proposal 4, etc.), a joint HARQ-ACK codebook or a separated HARQ-ACK codebook may be configured/indicated based on the PRI field.

For example, as described in the proposal 3, at least one of the first DCI or the second DCI may correspond to DCI format 1_0 with counter DAI field value of 1 on the PCell.

For example, as described in the proposal 4, at least one of the first DCI or the second DCI may correspond to DCI format 0_1 including $V^{\wedge}UL\_TDAI$ field (e.g., 1st DAI field). It may be indicated whether the HARQ-ACK codebook is transmitted by being multiplexed via the PUSCH based on the field.

For example, an operation for the UE (100/200 of FIGS. 16 to 20) of the above-described step S1410 to receive the first DCI and the second DCI may be implemented by the device of FIGS. 16 to 20 to be described below. For example, referring to FIG. 17, one or more processors 102 may control one or more transceivers 106 and/or one or more memories 104 so as to receive the first DCI and the second DCI, and the one or more transceivers 106 may receive the first DCI and the second DCI.

The UE may determine a physical uplink control channel (PUCCH) resource for a transmission of the HARQ-ACK information, in S1420. For example, the PUCCH resource may be determined based on the above-described methods (e.g., proposal 1/proposal 2/proposal 3/proposal 4, etc.).

For example, if the joint HARQ-ACK codebook is constructed, a PUCCH resource set may be determined based on a payload size of the extended codebook (i.e., considering the case of overlapping and transmitting in a time domain).

For example, if the joint HARQ-ACK codebook is constructed, a PUCCH resource may be determined depending on a PUCCH resource indicator (PRI) field value indicated through a specific DCI. If the UE receives different DCIs (e.g., first DCI and second DCI) from CORESETs corresponding to different CORESETPoolIndex, the order of DCI may be determined based on i) at a time point at which the DCI is transmitted, ii) CORESETPoolIndex configured to the CORESET to which the DCI is transmitted, and iii) a cell index (or ID). The time point at which the DCI is transmitted may mean an index of a monitoring occasion related to a channel (e.g., PDCCH) on which the DCI is transmitted. The PUCCH resource may be determined depending on a PRI field value of a specific DCI determined based on the order of DCI.

For example, the first DCI and the second DCI may be indexed based on (i) an index of a physical downlink control channel (PDCCH) related monitoring occasion, (ii) a cell index, and (iii) an index (e.g., CORESETPoolIndex) associated with each control resource set group. The PUCCH resource may be determined based on a last DCI among the first DCI and the second DCI.

Specifically, the DCIs may be indexed in ascending order of the cell index for the same PDCCH related monitoring occasion, and then may be indexed in ascending order of an index of the PDCCH related monitoring occasion. The DCIs in one serving cell within the same PDCCH related monitoring occasion may be indexed based on an index (e.g., CORESETPoolIndex) associated with the control resource set group. Based on that an index associated with the first control resource set group is 0, and an index associated with the second control resource set group is 1, the first DCI may be indexed earlier than the second DCI.

For example, if the UE receives different DCIs (e.g., first DCI and second DCI) from CORESETs corresponding to different CORESETPoolIndex, the PUCCH resource for the separated HARQ-ACK codebook transmission may be determined based on i) at a time point at which the DCI is transmitted, and ii) a cell index (or ID).

For example, an operation for the UE (100/200 of FIGS. 16 to 20) of the above-described step S1420 to determine the PUCCH resource may be implemented by the device of FIGS. 16 to 20 to be described below. For example, referring to FIG. 17, one or more processors 102 may control one or more transceivers 106 and/or one or more memories 104 so as to determine the PUCCH resource.

The UE may transmit HARQ-ACK information, in S1430. The HARQ-ACK information may be transmitted based on the PUCCH resource determined in the step S1420. The HARQ-ACK information may be transmitted via at least one of a first transmission reception point or a second transmission reception point.

For example, the UE may receive a first data channel scheduled by the first DCI and a second data channel scheduled by the second DCI. For example, the first DCI and the first data channel may be received via the first transmission reception point, and the second DCI and the second data channel may be received via the second transmission reception point. In this case, the HARQ-ACK information may be associated with the first data channel and the second data channel.

For example, based on that the information related to the feedback mode of the configuration information indicates a joint mode, first HARQ-ACK information associated with the first control resource set group and second HARQ-ACK information associated with the second control resource set group may be concatenated to construct one HARQ-ACK information. Further, the one HARQ-ACK information constructed by concatenating the first HARQ-ACK information associated with the first control resource set group and the second HARQ-ACK information associated with the second control resource set group may be transmitted at a specific transmission reception point via the same uplink resource (i.e., PUCCH, PUSCH, etc.).

As another example, the first control resource set group may be included in a first serving cell, and the second control resource set group may be included in a second serving cell. A first HARQ-ACK codebook for the first serving cell and a second HARQ-ACK codebook for the second serving cell may be separately generated, and the first HARQ-ACK codebook and the second HARQ-ACK codebook may be concatenated to generate one HARQ-ACK information.

For example, based on that the information related to the feedback mode indicates the separate mode, first HARQ-ACK information associated with the first control resource set group and second HARQ-ACK information associated with the second control resource set group each may be TDMed (time division multiplexing) in one slot and transmitted. Alternatively, each HARQ-ACK information may be transmitted at each transmission reception point via a different uplink resource (e.g., PUCCH, PUSCH, etc.).

For example, as described in the proposal 3, if at least one of the first DCI or the second DCI corresponds to DCI format 1_0 with counter DAI field value of 1 on the PCell, the UE may construct a codebook according to the compressed semi-static HARQ-ACK codebook generation scheme only for the HARQ-ACK codebook corresponding to a specific index configured (or mapped) to a CORESET in which the corresponding DCI is detected.

For example, as described in the proposal 4, if at least one of the first DCI or the second DCI corresponds to DCI format 0_1 including V^UL_TDAI field (e.g., 1st DAI field), it may be indicated whether the HARQ-ACK codebook is transmitted by being multiplexed via the PUSCH based on the field. That is, the HARQ-ACK codebook may be multiplexed and transmitted via the PUSCH according to the indication of the field.

For example, an operation for the UE (100/200 of FIGS. 16 to 20) of the above-described step S1430 to transmit the HARQ-ACK information may be implemented by the device of FIGS. 16 to 20 to be described below. For example, referring to FIG. 17, one or more processors 102 may control one or more transceivers 106 and/or one or more memories 104 so as to transmit the HARQ-ACK information, and the one or more transceivers 106 may transmit the HARQ-ACK information.

FIG. 15 illustrates an example of a flow chart of a data transmission and reception operation of a base station (BS) to which the methods (e.g., proposal 1/proposal 2/proposal 3/proposal 4, etc.) described in the present disclosure are applicable. FIG. 15 is merely for convenience of explanation and does not limit the scope of the present disclosure. Some step(s) illustrated in FIG. 15 may be omitted according to situation and/or configuration.

The base station and the UE may collectively refer to an object performing data transmission and reception. For example, the base station may be a concept including one or more transmission points (TPs) and one or more transmission and reception points (TRPs). Also, the TPs and/or TRPs may include the base station's panels, transmission and reception units, etc. Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed via higher layer signaling (e.g., RRC signaling).

Although not shown in FIG. 15, the base station may transmit configuration information to the UE. The configuration information may be transmitted via higher layer signaling (e.g., RRC or MAC CE, etc.). An operation of transmitting the configuration information may be performed before the operation of transmitting the first DCI and the second DCI in the step S1510.

For example, the configuration information may include CORESET related configuration information (e.g., ControlResourceSet IE) as described in the above-described methods (e.g., proposal 1/proposal 2/proposal 3/proposal 4, etc.). The CORESET related configuration information may include a CORESET related ID (e.g., controlResourceSetID), an index of CORESET pool for CORESET (e.g., CORESETPoolIndex), time/frequency resource configuration of CORESET, TCI information related to CORESET, and the like.

For example, if an index (e.g., CORESETPoolIndex) of a CORESET pool corresponding to a specific CORESET is not indicated/configured, the UE may assume that index 0 (e.g., CORESETPoolIndex=0) is assigned to the corresponding CORESET.

For example, the configuration information may include information (e.g., ackNackFeedbackMode) related to a feedback mode of the HARQ-ACK information. The information related to the feedback mode may indicate one of a joint mode or a separate mode, and a HARQ-ACK codebook may be constructed based on the indicated mode. For example, as described in the above-described methods (e.g., proposal 1/proposal 2/proposal 3/proposal 4, etc.), a joint HARQ-ACK codebook may be constructed if the joint mode is indicated, and a separated HARQ-ACK codebook may be constructed if the separate mode is indicated.

The base station may transmit, to the user equipment (UE), first downlink control information (DCI) based on a first control resource set group and second DCI based on a second control resource set group, in S1510. Transmitting each DCI based on a different control resource set group may mean transmitting each DCI via CORESET corresponding to a different CORESETPoolIndex. That is, CORESETPoolIndex corresponding to CORESET to which each DCI is transmitted may be differently configured.

The first DCI and the second DCI may be transmitted via a physical downlink control channel (e.g., PDCCH). Each DCI may include a DMRS port related field, a transport block related field, a PUCCH resource indicator (PRI) field, and the like.

For example, an operation for the base station (100/200 of FIGS. 16 to 20) of the above-described step S1510 to transmit the first DCI and the second DCI may be implemented by the device of FIGS. 16 to 20 to be described below. For example, referring to FIG. 17, one or more processors 102 may control one or more transceivers 106 and/or one or more memories 104 so as to transmit the first DCI and the second DCI, and the one or more transceivers 106 may transmit the first DCI and the second DCI to the UE.

The base station may transmit, to the UE, a first data channel scheduled by the first DCI and a second data channel scheduled by the second DCI, in S1520. For example, the first DCI and the first data channel may be received through a first transmission and reception point, and the second DCI and the second data channel may be received through a second transmission and reception point. For example, the data channel may be a PDSCH.

For example, an operation for the base station (100/200 of FIGS. 16 to 20) of the above-described step S1520 to transmit the first data channel and the second data channel may be implemented by the device of FIGS. 16 to 20 to be described below. For example, referring to FIG. 17, one or more processors 102 may control one or more transceivers 106 and/or one or more memories 104 so as to transmit the first data channel and the second data channel, and the one or more transceivers 106 may transmit the first data channel and the second data channel to the UE.

The base station may receive HARQ-ACK information from the UE based on a physical uplink control channel (PUCCH) resource, in S1530.

For example, the PUCCH resource may be determined based on the above-described methods (e.g., proposal 1/proposal 2/proposal 3/proposal 4, etc.). For example, the first DCI and the second DCI may be indexed based on (i) an index of a physical downlink control channel (PDCCH) related monitoring occasion, (ii) a cell index, and (iii) an index (e.g., CORESETPoolIndex) associated with each control resource set group. The PUCCH resource may be determined based on a last DCI among the first DCI and the second DCI.

Specifically, the DCIs may be indexed in ascending order of the cell index for the same PDCCH related monitoring occasion, and then may be indexed in ascending order of an index of the PDCCH related monitoring occasion. The DCIs in one serving cell within the same PDCCH related monitoring occasion may be indexed based on an index (e.g., CORESETPoolIndex) associated with the control resource set group. Based on that an index associated with the first control resource set group is 0, and an index associated with the second control resource set group is 1, the first DCI may be indexed earlier than the second DCI.

For example, based on that the information related to the feedback mode of the configuration information indicates the joint mode, first HARQ-ACK information associated with the first control resource set group and second HARQ-ACK information associated with the second control resource set group may be concatenated to construct one HARQ-ACK information. Further, the one HARQ-ACK information constructed by concatenating the first HARQ-ACK information associated with the first control resource set group and the second HARQ-ACK information associated with the second control resource set group may be transmitted at a specific transmission reception point via the same uplink resource (i.e., PUCCH, PUSCH, etc.).

As another example, the first control resource set group may be included in a first serving cell, and the second control resource set group may be included in a second serving cell. A first HARQ-ACK codebook for the first serving cell and a second HARQ-ACK codebook for the second serving cell may be separately generated, and the first HARQ-ACK codebook and the second HARQ-ACK codebook may be concatenated to generate one HARQ-ACK information.

For example, based on that the information related to the feedback mode indicates the separate mode, first HARQ-ACK information associated with the first control resource set group and second HARQ-ACK information associated with the second control resource set group each may be TDMed (time division multiplexing) in one slot and transmitted. Alternatively, each HARQ-ACK information may be transmitted at each transmission reception point via a different uplink resource (e.g., PUCCH, PUSCH, etc.).

For example, an operation for the base station (100/200 of FIGS. 16 to 20) of the above-described step S1530 to receive the HARQ-ACK information may be implemented by the device of FIGS. 16 to 20 to be described below. For example, referring to FIG. 17, one or more processors 102 may control one or more transceivers 106 and/or one or more memories 104 so as to receive the HARQ-ACK information, and the one or more transceivers 106 may receive the HARQ-ACK information from the UE.

As mentioned above, the network side/UE signaling and operation (e.g., proposal 1/proposal 2/proposal 3/proposal 4/FIG. 13/FIG. 14/FIG. 15, etc.) described above may be implemented by the device to be described below (e.g., FIGS. 16 to 20). For example, the network side (e.g., TRP 1/TRP 2) may correspond to a first wireless device, and the UE may correspond to a second wireless device. In some cases, the reverse may also be considered. For example, a first device (e.g., TRP 1)/a second device (e.g., TRP 2) may correspond to a first wireless device, and the UE may correspond to a second wireless device. In some cases, the reverse may also be considered.

For example, the network side/UE signaling and operation (e.g., proposal 1/proposal 2/proposal 3/proposal 4/FIG.

13/FIG. 14/FIG. 15, etc.) described above may be processed by one or more processors (e.g., 102 and 202) of FIGS. 16 to 20, and the network side/UE signaling and operation (e.g., proposal 1/proposal 2/proposal 3/proposal 4/FIG. 13/FIG. 14/FIG. 15, etc.) described above may be stored in one or more memories (e.g., 104 and 204) in the form of a command/program (e.g., instruction, executable code) for running the one or more processors (e.g., 102 and 202) of FIGS. 16 to 20.

For example, in a device comprising one or more memories and one or more processors operatively connected to the one or more memories, the one or more processors may be configured to allow the device to (i) receive first downlink control information (DCI) based on a first control resource set group and second DCI based on a second control resource set group, (ii) determine a physical uplink control channel (PUCCH) resource for a transmission of the HARQ-ACK information, and (iii) transmit the HARQ-ACK information based on the determined PUCCH resource. In this instance, the first DCI and the second DCI may be indexed (or order of the first DCI and the second DCI may be determined) based on (i) an index of a physical downlink control channel (PDCCH) related monitoring occasion, (ii) a cell index, and (iii) an index associated with each control resource set group. The PUCCH resource may be determined based on a last DCI among the first DCI and the second DCI.

As another example, in one or more non-transitory computer readable mediums storing one or more instructions, the one or more instructions executable by one or more processors may allow a user equipment (UE) to (i) receive first downlink control information (DCI) based on a first control resource set group and second DCI based on a second control resource set group, (ii) determine a physical uplink control channel (PUCCH) resource for a transmission of the HARQ-ACK information, and (iii) transmit the HARQ-ACK information based on the determined PUCCH resource. In this instance, the first DCI and the second DCI may be indexed (or order of the first DCI and the second DCI may be determined) based on (i) an index of a physical downlink control channel (PDCCH) related monitoring occasion, (ii) a cell index, and (iii) an index associated with each control resource set group. The PUCCH resource may be determined based on a last DCI among the first DCI and the second DCI.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 illustrates a communication system applied to the present disclosure.

Referring to FIG. 16, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1010a, vehicles 1010b-1 and 1010b-2, an eXtended Reality (XR) device 1010c, a hand-held device 1010d, a home appliance 1010e, an Internet of Things (IoT) device 1010f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 1010a to 1010f may be connected to the network 300 via the BSs 1020. An AI technology may be applied to the wireless devices 1010a to 1010f and the wireless devices 1010a to 1010f may be connected to the AI server 400 via the network 300. The network 300 may be configured using a 3G network, a 4G (e.g., LTE) network, or a 5G (e.g., NR) network. Although the wireless devices 1010a to 1010f may communicate with each other through the BSs 1020/network 300, the wireless devices 1010a to 1010f may perform direct communication (e.g., sidelink communication) with each other without passing through the BSs/network. For example, the vehicles 1010b-1 and 1010b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1010a to 1010f.

Wireless communication/connections 150a, 150b, or 150c may be established between the wireless devices 1010a to 1010f/BS 1020, or BS 1020/BS 1020. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 1010x and the BS 1020} and/or {the wireless device 1010x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

FIG. 18 illustrates a signal processing circuit for a transmit signal.

Referring to FIG. 18, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 18 may be performed by the processors 102 and 202 and/or the transceivers 106 and 206 of FIG. 17. Hardware elements of FIG. 18 may be implemented in the processors 102 and 202 and/or the transceivers 106 and 206 of FIG. 17. For example, blocks 1010 to 1060 may be implemented in the processors 102 and 202 of FIG. 17. Further, blocks 1010 to 1050 may be implemented in the processors 102 and 202 of FIG. 17 and the block 1060 of FIG. 17 and the block 2060 may be implemented in the transceivers 106 and 206 of FIG. 17.

A codeword may be transformed into a radio signal via the signal processing circuit 1000 of FIG. 18. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 18. For example, the wireless device (e.g., 100 or 200 of FIG. 17) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

FIG. 19 illustrates another example of a wireless device applied to the present disclosure. The wireless device may be implemented in various forms according to a use-case/service (refer to FIG. 16).

Referring to FIG. 19, wireless devices 1010 and 1020 may correspond to the wireless devices 100 and 200 of FIG. 17 and may be configured by various elements, components, units/portions, and/or modules. For example, each of the wireless devices 1010 and 2010 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 17. For example, the transceiver(s) 114 may include the one or more transceivers 106 and 106 and/or the one or more antennas 108 and 108 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1010a of FIG. 16), the vehicles (1010b-1 and 1010b-2 of FIG. 16), the XR device (1010c of FIG. 16), the hand-held device (1010d of FIG. 16), the home appliance (1010e of FIG. 16), the IoT device (1010f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (1020 of FIG. 16), a network node, etc. The wireless device may be used in a mobile or fixed place according to a use-example/service.

In FIG. 17, the entirety of the various elements, components, units/portions, and/or modules in the wireless devices 100 and 100 may be connected to each other through a wired interface or at least a part thereof may be wirelessly connected through the communication unit 110. For example, in each of the wireless devices 100 and 100, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 100 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Disclosure is Applied

FIG. 20 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 20, a portable device 1010 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 19, respectively.

The communication unit 110 may transmit/receive a signal (e.g., data, a control signal, etc.) to/from another wireless device and eNBs. The control unit 120 may perform various operations by controlling components of the portable device 1010. The control unit 120 may include an Application Processor (AP). The memory unit 130 may store data/parameters/programs/codes/instructions required for driving the portable device 1010. Further, the memory unit 130 may store input/output data/information, etc. The power supply unit 140a may supply power to the portable device 1010 and include a wired/wireless charging circuit, a battery, and the like. The interface unit 140b may support a connection between the portable device 1010 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL AVAILABILITY

Although the method of transmitting and receiving HARQ-ACK information in the wireless communication system of the present disclosure has been described in connection with examples in which it applies to 3GPP LTE/LTE-A system and 5G systems (new RAT systems), the method is also applicable to other various wireless communication systems.

What is claimed is:

1. A method performed by a user equipment (UE) in a wireless communication system, the method comprising:
   receiving, from a base station (BS), i) one or more first downlink control information (DCI) formats based on one or more first COntrol REsource SETs (CORESETs) related to a first CORESET pool and ii) one or more second DCI formats based on one or more second CORESETs related to a second CORESET pool;
   receiving, from the BS, i) one or more first physical downlink shared channels (PDSCHs) scheduled based on the one or more first DCI formats and ii) one or more second PDSCHs scheduled based on the one or more second DCI formats;
   determining a physical uplink control channel (PUCCH) resource for transmission of hybrid automatic repeat and reQuest-acknowledgement (HARQ-ACK) information which is related to at least one of the one or more first PDSCHs and the one or more second PDSCHs; and
   transmitting, to the BS, the HARQ-ACK information based on the determined PUCCH resource,
   wherein each of the one or more first DCI formats and the one or more second DCI formats includes a PUCCH resource indicator field,
   wherein, based on a feedback mode of the HARQ-ACK information being configured as a separate mode:
      the one or more first DCI formats are indexed based on (i) a serving cell index and (ii) an index of a physical downlink control channel (PDCCH) monitoring occasion, and the one or more second DCI formats are indexed based on (i) the serving cell index and (ii) the index of the PDCCH monitoring occasion,
      the first HARQ-ACK information associated with the first CORESET pool is transmitted based on a first PUCCH resource which is determined based on a first DCI format with a last index among the first DCI formats, and
      the second HARQ-ACK information associated with the second CORESET pool is transmitted based on a second PUCCH resource which is determined based on a second DCI format with a last index among the second DCI formats,
   wherein, based on the feedback mode of the HARQ-ACK information being configured as a joint mode:
      the one or more first DCI formats and the one or more second DCI formats are indexed based on (i) the cell index, (ii) the index of the PDCCH monitoring occasion, and (iii) an index of each CORESET pool,
      a third PUCCH resource is determined based on a last DCI format which is a DCI format with a last index among the one or more first DCI formats and the one or more second DCI formats, and
      information in which the first HARQ-ACK information and the second HARQ-ACK information are concatenated, is transmitted based on the third PUCCH resource.

2. The method of claim 1, further comprising:
   receiving configuration information,
   wherein the configuration information includes information related to the feedback mode of the HARQ-ACK information.

3. The method of claim 2, wherein the information related to the feedback mode indicates one of the joint mode or the separate mode.

4. The method of claim 1, wherein the one or more first DCI formats and/or the one or more second DCI formats are indexed in an ascending order of the cell index for the same PDCCH monitoring occasion, and then are indexed in an ascending order of the index of the PDCCH monitoring occasion.

5. The method of claim 1, wherein, based on the feedback mode of the HARQ-ACK information being configured as the joint mode, the first HARQ-ACK information and the second HARQ-ACK information are concatenated to construct one HARQ-ACK information.

6. The method of claim 5, wherein, based on that an index of the first CORESET pool is 0 and an index of the second CORESET pool is 1, the one or more first DCI formats are indexed prior to the one or more second DCI formats.

7. The method of claim 1, wherein, based on the feedback mode configured as the separate mode, the first HARQ-ACK information and the second HARQ-ACK information each are TDMed (time division multiplexing) in one slot and are transmitted.

8. The method of claim 1, wherein the first CORESET pool is included in a first serving cell, and the second CORESET pool is included in a second serving cell,
   wherein a first HARQ-ACK codebook for the first serving cell and a second HARQ-ACK codebook for the second serving cell are separately generated, and
   wherein the HARQ-ACK information is generated by concatenating the first HARQ-ACK codebook and the second HARQ-ACK codebook.

9. The method of claim 1, wherein each of the one or more first DCI formats and the one or more second DCI formats is with Cyclic Redundancy Check (CRC) scrambled by a Cell-Radio Network Temporary Identifier (C-RNTI).

10. The method of claim 1, wherein the one or more first DCI formats and the one or more first PDSCHs are received through a first transmission and reception point, and the one or more second DCI formats and the one or more second PDSCHs are received through a second transmission and reception point.

11. The method of claim 1, wherein the HARQ-ACK information is transmitted through at least one of a first transmission and reception point or a second transmission and reception point.

12. The method of claim 1, wherein each of the one or more first DCI formats and the one or more second DCI formats includes a Downlink Assignment Index (DAI) field.

13. A user equipment (UE) configured to operate in a wireless communication system, the UE comprising:
one or more transceivers;
one or more processors; and
one or more memories connected to the one or more processors and storing instructions that, based on being executed by the one or more processors, perform operations that comprise:
receiving, from a base station (BS), i) one or more first downlink control informations (DCI) formats based on one or more first COntrol REsource SETs (CORESETs) related to a first CORESET pool and ii) one or more second DCI formats based on one or more second CORESETs related to a second CORESET pool;
receiving, from the BS, i) one or more first physical downlink shared channels (PDSCHs) scheduled based on the one or more first DCI formats and ii) one or more second PDSCHs scheduled based on the one or more second DCI formats;
determining a physical uplink control channel (PUCCH) resource for transmission of hybrid automatic repeat and reQuest-acknowledgement (HARQ-ACK) information which is related to at least one of the one or more first PDSCHs and the one or more second PDSCHs; and
transmitting, to the BS, the HARQ-ACK information based on the determined PUCCH resource,
wherein each of the one or more first DCI formats and the one or more second DCI formats includes a PUCCH resource indicator field,
wherein, based on a feedback mode of the HARQ-ACK information being configured as a separate mode:
the one or more first DCI formats are indexed based on (i) a serving cell index and (ii) an index of a physical downlink control channel (PDCCH) monitoring occasion, and the one or more second DCI formats are indexed based on (i) the serving cell index and (ii) the index of the PDCCH monitoring occasion,
the first HARQ-ACK information associated with the first CORESET pool is transmitted based on a first PUCCH resource which is determined based on a first DCI format with a last index among the first DCI formats, and
the second HARQ-ACK information associated with the second CORESET pool is transmitted based on a second PUCCH resource which is determined based on a second DCI format with a last index among the second DCI formats,
wherein, based on the feedback mode of the HARQ-ACK information being configured as a joint mode:
the one or more first DCI formats and the one or more second DCI formats are indexed based on (i) the cell index, (ii) the index of the PDCCH monitoring occasion and (iii) an index of each CORESET pool, a third PUCCH resource is determined based on a last DCI format which is a DCI format with a last index among the one or more first DCI formats and the one or more second DCI formats, and
information in which the first HARQ-ACK information and the second HARQ-ACK information are concatenated, is transmitted based on the third PUCCH resource.

14. The UE of claim 13, wherein, based on that an index associated with the first CORESET pool is 0, and an index associated with the second CORESET pool is 1, the one or more first DCI formats are indexed prior to the one or more second DCI formats.

15. A base station (BS) configured to operate in a wireless communication system, the BS comprising:
one or more transceivers;
one or more processors; and
one or more memories connected to the one or more processors and storing instructions that, based on being executed by the one or more processors, perform operations that comprise:
transmitting, to a user equipment (UE), i) one or more first downlink control informations (DCI) formats based on one or more first COntrol REsource SETs (CORESETs) related to a first CORESET pool and ii) one or more second DCI formats based on one or more second CORESETs related to a second CORESET pool;
transmitting, to the UE, i) one or more first physical downlink shared channels (PDSCHs) scheduled based on the one or more first DCI formats and ii) one or more second PDSCHs scheduled based on the one or more second DCI formats;
receiving, from the UE, hybrid automatic repeat and reQuest-acknowledgement (HARQ-ACK) information based on a physical uplink control channel (PUCCH) resource,
wherein each of the one or more first DCI formats and the one or more second DCI formats includes a PUCCH resource indicator field,
wherein the HARQ-ACK information is related to at least one of the one or more first PDSCHs and the one or more second PDSCHs; and
wherein, based on a feedback mode of the HARQ-ACK information being configured as a separate mode:
the one or more first DCI formats are indexed based on (i) a serving cell index and (ii) an index of a physical downlink control channel (PDCCH) monitoring occasion, and the one or more second DCI formats are indexed based on (i) the serving cell index and (ii) the index of the PDCCH monitoring occasion,
the first HARQ-ACK information associated with the first CORESET pool is received based on a first PUCCH resource which is determined based on a first DCI format with a last index among the first DCI formats, and
the second HARQ-ACK information associated with the second CORESET pool is received based on a second PUCCH resource which is determined based on a second DCI format with a last index among the second DCI formats,
wherein, based on the feedback mode of the HARQ-ACK information being configured as a joint mode:
the one or more first DCI formats and the one or more second DCI formats are indexed based on (i) the cell index, (ii) the index of the PDCCH monitoring occasion and (iii) an index of each CORESET pool, a third PUCCH resource is determined based on a last DCI format which is a DCI format with a last index among the one or more first DCI formats and the one or more second DCI formats, and information in which the first HARQ-ACK information and the second HARQ-ACK information are concatenated, is received based on the third PUCCH resource.

* * * * *